(12) United States Patent
Nesbitt

(10) Patent No.: US 9,266,509 B1
(45) Date of Patent: Feb. 23, 2016

(54) VEHICLE BRAKING SYSTEM BRAKE BIAS ADJUSTER HAVING A VISIBLE BRAKE BIAS RATIO INDICATOR AND METHOD AND APPARATUS FOR RETROFITTING A VEHICLE WITH A VEHICLE BRAKING SYSTEM BRAKE BIAS ADJUSTMENT KNOB ASSEMBLY HAVING A VISIBLE BRAKE BIAS RATIO INDICATOR

(71) Applicant: Innovatech, LLC, Chicago, IL (US)

(72) Inventor: Bruce Nesbitt, Chicago, IL (US)

(73) Assignee: Innovatech, LLC, Chicago, IL (US)

( * ) Notice: Subject to any disclaimer, the term of this patent is extended or adjusted under 35 U.S.C. 154(b) by 0 days.

(21) Appl. No.: 14/552,947

(22) Filed: Nov. 25, 2014

(51) Int. Cl.
  *B60T 7/06* (2006.01)
  *B60T 8/26* (2006.01)
  *G05G 1/10* (2006.01)
  *G05G 1/40* (2008.04)

(52) U.S. Cl.
  CPC ... *B60T 8/26* (2013.01); *B60T 7/06* (2013.01); *G05G 1/10* (2013.01); *G05G 1/40* (2013.01); *Y10S 16/30* (2013.01); *Y10T 74/20528* (2015.01)

(58) Field of Classification Search
  CPC ............. B60T 7/04; B60T 7/06; B60T 7/065; B60T 8/26; Y10T 74/206; Y10T 74/20888; Y10T 74/20528; G05G 1/10; G05G 1/40; G05G 7/02; G05G 7/04; Y10S 16/30
  See application file for complete search history.

(56) References Cited

U.S. PATENT DOCUMENTS

| | | | |
|---|---|---|---|
| 1,692,605 A | 11/1928 | Wolf | |
| 2,532,970 A | 12/1950 | Van Dyke | |
| 2,539,575 A | 1/1951 | George | |
| 2,658,395 A * | 11/1953 | Coates | B60N 2/2252 475/158 |
| 2,746,417 A | 5/1956 | McCord et al. | |
| 2,805,636 A | 9/1957 | Smith | |
| 2,980,055 A | 4/1961 | Burns | |
| 3,136,294 A | 6/1964 | Arnold et al. | |

(Continued)

OTHER PUBLICATIONS

Pegasus Auto Racing Supplies, Tilton Dual Pedail Asmy 5.5 Ratio, Overhung Mi, Aluminum, Printed from https://www.pegasusautoracing.com/productdetails.asp?RecId=6395&utm_souce=Google... on Oct. 5, 2013 (1 Page).

(Continued)

*Primary Examiner* — Anna Momper
(74) *Attorney, Agent, or Firm* — Neal, Gerber & Eisenberg LLP

(57) ABSTRACT

A vehicle braking system bias adjuster which includes a brake bias adjustment knob assembly which enables the driver of the vehicle to quickly and easily set, adjust, and visually and quickly determine the relative front to rear (or right front to left front) brake bias or brake bias setting of the vehicle before and while driving the vehicle. The brake bias adjustment knob assembly visually indicates the exact amount of brake bias, or if there is no bias at all. The ratio is expressed in numbers to enable the driver to reset the brake bias to a known value of ratio as needed for track conditions and vehicle weight changes. The value in numbers is reproducible. The present disclosure also provides a method and apparatus for retrofitting an existing vehicle with a brake bias adjustment knob assembly which enables the driver of the vehicle to quickly and easily set, adjust, and visually determine the relative brake bias or brake bias setting (i.e., the ratio of front to rear brake biasing or the ratio of side to side brake biasing) of the vehicle before and while driving the vehicle.

28 Claims, 21 Drawing Sheets

(56) References Cited

U.S. PATENT DOCUMENTS

| | | | |
|---|---|---|---|
| 3,895,600 A | | 7/1975 | DeLong |
| 3,934,939 A | | 1/1976 | Hida |
| 3,949,702 A | | 4/1976 | DeLong |
| 3,991,702 A | | 11/1976 | Taylor |
| 4,016,755 A | | 4/1977 | Anderberg et al. |
| 4,776,438 A | | 10/1988 | Schandelmeier |
| 5,646,849 A | | 7/1997 | Walenty et al. |
| 5,697,260 A | * | 12/1997 | Rixon .................. B60K 26/021 74/513 |
| 5,819,593 A | * | 10/1998 | Rixon .................. B60K 26/021 74/513 |
| 5,950,245 A | * | 9/1999 | Binduga ................ A42B 3/145 2/183 |
| 6,357,291 B1 | | 3/2002 | Jenness et al. |
| 6,516,683 B2 | * | 2/2003 | Sundaresan ............ G05G 1/405 74/560 |
| D472,947 S | * | 4/2003 | Wu .............................. D21/694 |
| 2002/0166408 A1 | * | 11/2002 | Willemsen ............ G05G 1/405 74/560 |
| 2003/0056615 A1 | * | 3/2003 | Oberheide ................ B60T 7/06 74/512 |
| 2005/0016319 A1 | * | 1/2005 | Kiczek .................... G05G 1/40 74/512 |
| 2005/0160869 A1 | * | 7/2005 | Willemsen ............ G05G 1/015 74/512 |
| 2006/0266190 A1 | * | 11/2006 | Saitou .................. B23D 45/044 83/581 |

OTHER PUBLICATIONS

Ebay, Remote Brake Bias Cable and Adjuster System RS Group 4, Escort Rally Locost F2, Printed from http://www.ebay.com/itm/161095790872 on Oct. 5, 2013 (3 Pages).

Installation Instructions for Premium Remote Bias Adjuster, Published by Tilton Engineering, Available prior to Nov. 25, 2014 (1 Page).

Brake Balance or Brake Bias, Published by Technical F1 Dictionary, Available prior to Nov. 25. 2014 (3 Pages).

AbsoluteHobbyz.com, Buku Brake Bias Tool, Published prior to Nov. 25, 2014 (2 Pages).

Ebay Picture, New Nascar Tilton Brake Pedal Balance Bar, Printed from http://www.ebay.com/itm/NEW-NASCAR-TILTON-BRAKE-PEDAL-BALANCE-BAR . . . on Nov. 17, 2013 (1 Page).

Ebay Picture, Tilton Brake Remote Bias Adjuster, Printed from http://i.ebaying.com/t/tilton-brake-remote-bias-adjuster-imca-nascar-ump-sprint-car-/00/ . . . on Nov. 17, 2013 (1 Page).

Logitech Driving Force GT Wheel for PS3, PS2 & PC, Available prior to Nov. 25. 2014 (7 Pages).

BuKu Performance Products Brake Bias Gauge, Available prior to Nov. 25, 2014 (4 Pages).

KNOB, Available prior to Nov. 25, 2014 (1 Page).

Brakeometer Alcoa device, Available prior to Nov. 25, 2014 (1 Page).

* cited by examiner

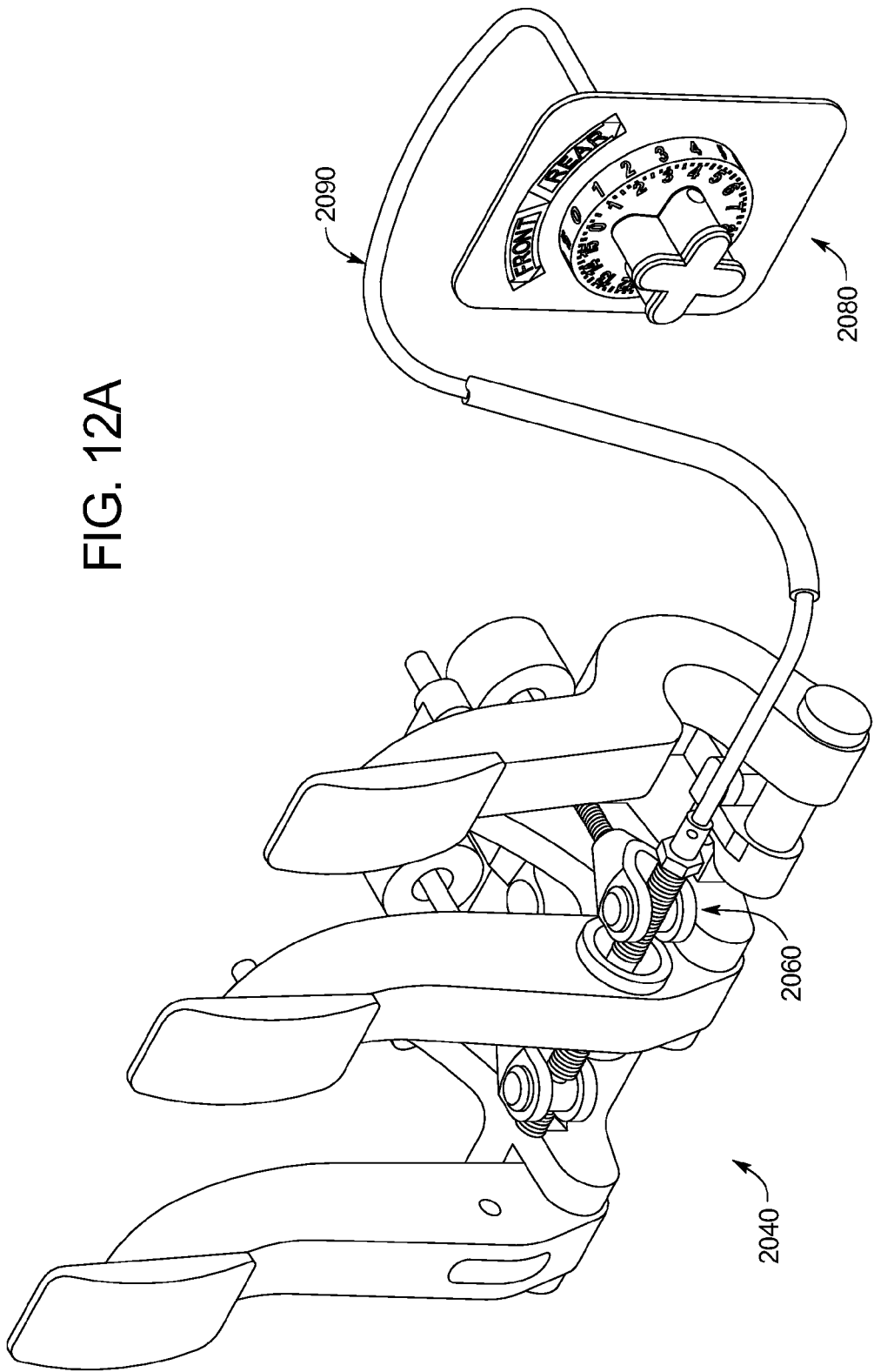

FIG. 13
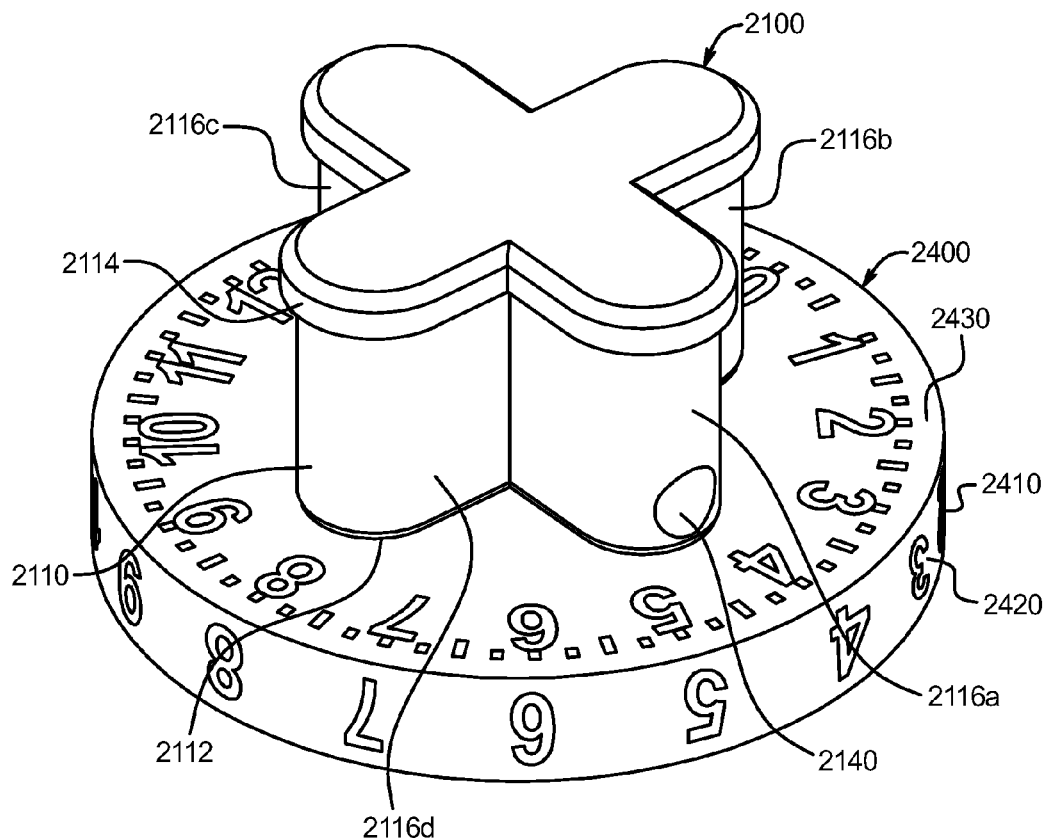
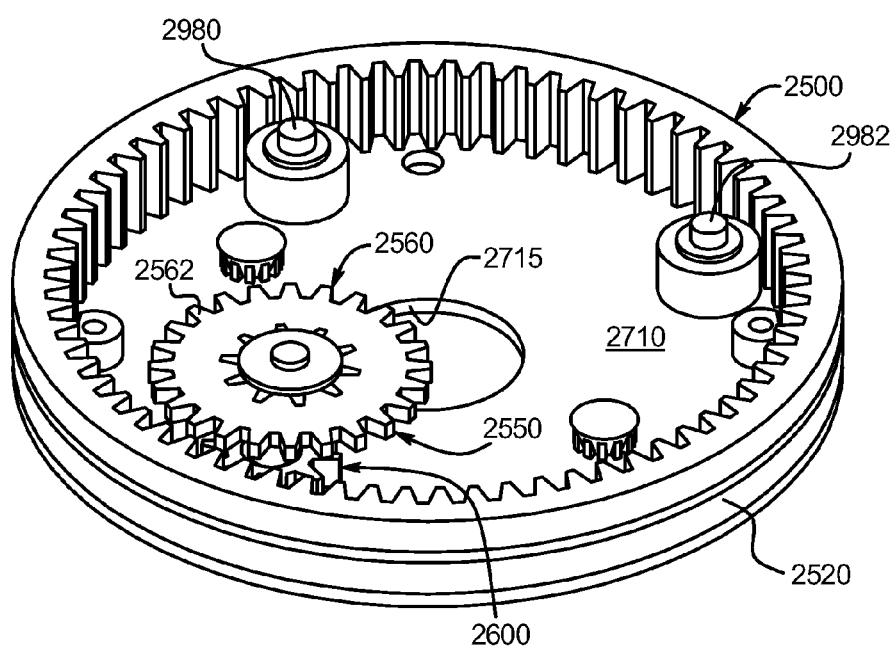

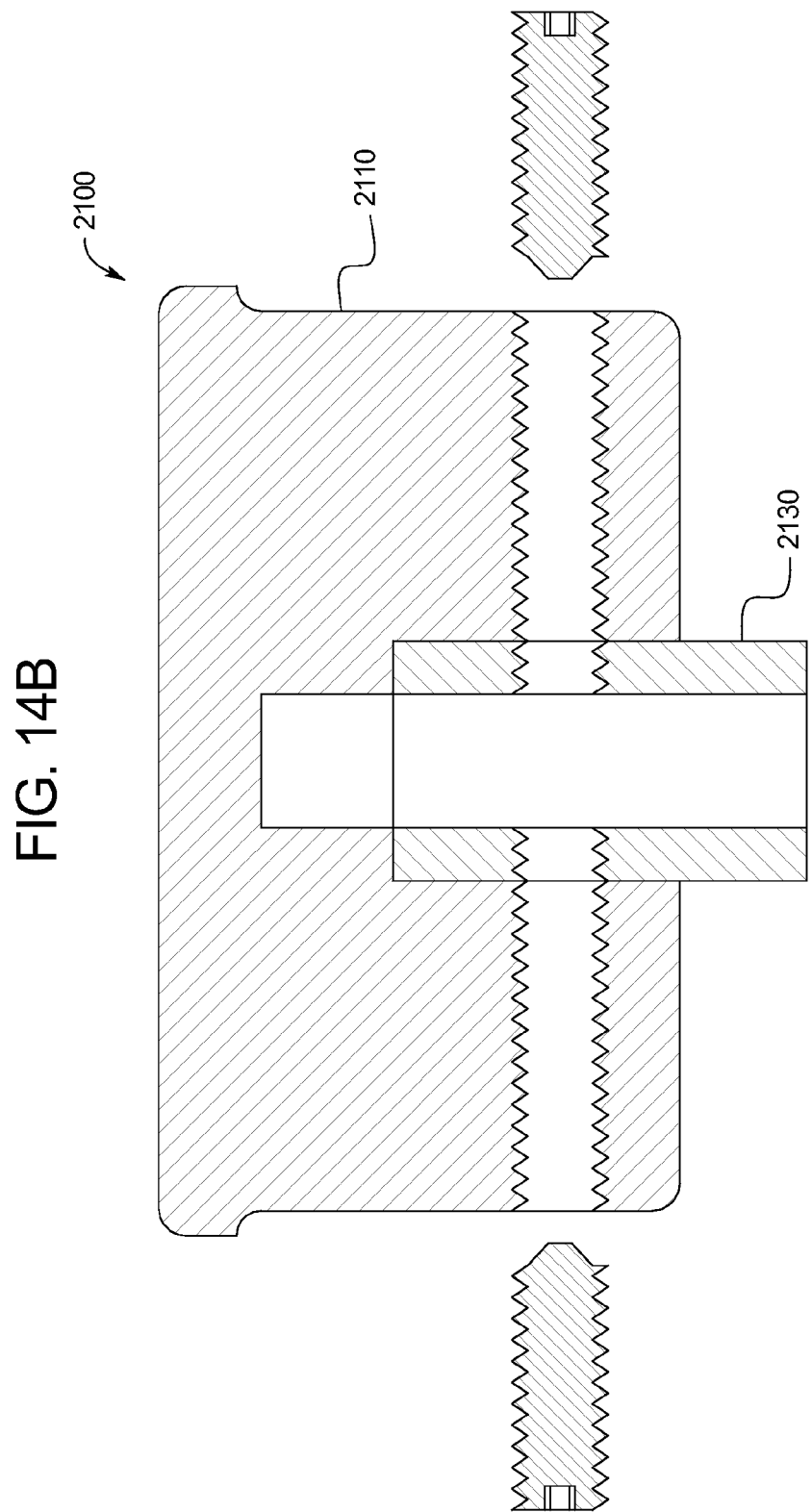

VEHICLE BRAKING SYSTEM BRAKE BIAS ADJUSTER HAVING A VISIBLE BRAKE BIAS RATIO INDICATOR AND METHOD AND APPARATUS FOR RETROFITTING A VEHICLE WITH A VEHICLE BRAKING SYSTEM BRAKE BIAS ADJUSTMENT KNOB ASSEMBLY HAVING A VISIBLE BRAKE BIAS RATIO INDICATOR

BACKGROUND

All race cars have an engine speed monitor called a tachometer or revolution counter. However, the race car braking system, which dissipates energy the engine produces in propelling the race car, has had no brake force monitor (even though the braking system can dissipate engine power in a few seconds, and is thus in one sense more powerful than the engine). Many race cars have adjustment capability for the driver to change the ratio of front to rear brake pressure and therefore, relative braking force. Certain race cars also (or alternatively) have adjustment requirements or capability for the driver to change the ratio of right wheel to left wheel front brake pressure and therefore, relative braking force. There is a need for a monitor for brake force adjustments in race cars, and to provide the driver with the knowledge of how the brake forces are distributed, which enhances race car performance and provides enhanced safety.

More specifically, race cars typically include a vehicle braking system with a brake bias adjuster which enhances and facilitates optimization of race car performance. The brake bias adjuster enables the driver to adjust and set a bias between the front brakes and the rear brakes of the braking system of the race car (and/or between the right and left front brakes of the braking system of the race car). Front brake bias enhances straight line braking (i.e., braking that occurs when the race car is moving in a straight line). This is because under heavy braking during straight line movement, weight distribution moves or transfers toward the front of the race car which enables the race car to slow down faster. Front brake bias also increases the chance of locking the front wheels of the race car during non-straight line movement or turning. On the other hand, rear brake bias provides a lighter braking force which assists in controlling the race car during non-straight line movement or turning that require braking. If too much rear brake force is exerted, relative to the front brakes, the rear tires will "lock up" and the race car can rotate or "spin out," possibly creating an unsafe or dangerous condition.

One problem with known commercially available brake bias adjusters is that the driver cannot quickly and easily determine the relative front to back brake bias or brake bias setting (or right to left front brake bias or brake bias setting) while driving the race car. More specifically, known commercially available brake bias adjusters generally include: (a) a biasing mechanism coupled to the pedal assembly of the race car; (b) a brake bias adjustment knob; and (c) a connection cable such as a flexible shaft attached at one end to the brake bias adjustment knob and at the other end to the biasing mechanism coupled to the brake pedal assembly. In various commercially available braking systems, the biasing mechanism includes: (a) an internally threaded fulcrum device between the two master cylinders of the brake pedal assembly; (b) a pivoting bearing in the middle of the fulcrum that is configured to move or slide back and forth relative to the threaded fulcrum; and (c) a threaded shaft mounted in the pivoting bearing which causes the pivoting bearing to move or slide relative to the threaded fulcrum. When the brake bias adjustment knob is rotated, the connection cable rotates, and the threaded fulcrum shaft rotates, which causes leverage or bias or ratio of force distribution between the front and rear brakes to be changed. However, these known commercially available brake bias adjustment knobs do not visually indicate the position of the sliding bearing which is moved by the threaded shaft (in specific relative position or in specific number of turns) from one end of the pivoting bearing housing to the other end of the pivoting bearing housing. In other words, no visible specific indication exists to enable the driver to learn the bearing pivot position. When a driver looks at a known brake bias adjustment knob, the driver cannot determine: (a) the amount of brake bias toward the front or rear brakes; (b) if there is no bias set at all; or (c) if the bias is incorrectly set. This means that the driver must: (a) remember at all times how the brake bias adjuster is set (including the original setting and all adjustments made by the driver before and during the race); and/or (b) before each competition or event, turn the knob and the threaded shaft all the way in one direction to move the bearing pivot to the extreme front or rear brake position and then count the turns or rotations away from that position and remember the new position.

It is also virtually impossible for the driver to actually learn or know where the brake bias is set once a race car is in motion. The reason for this is that the only reference point is counting turns of an unmarked knob that adjusts the threaded fulcrum either from the fully front brake position or the full rear brake position. Once the race car is in motion, and the brakes are applied, the knob and cable are unable to turn because of the force exerted by the driver when pressing on the brake pedal locks the sliding bearing and prevents it from moving laterally. A race car driver has to use the brakes in a competition many times a lap. This lack of knowledge as to where the brake bias is set prevents the driver from turning the knob and applying the brakes simultaneously. The driver can either rotate the knob and therefore the adjustment at the brake bias bar in the brake pedal housing or apply the brakes of the car, but can't to both simultaneously. Commonly, drivers count the turns from either the front of the rear end of the travel of the pivot bearing. This cannot be done, once again, if the brakes are applied.

To solve these problems, there is a need for braking system with a brake bias adjuster which enables the driver to quickly learn or know, preferably visually, where the brake proportion is set for the car and firstly, verify the position of the brake bias and if needed, easily set, adjust, and determine the relative brake bias or brake bias setting of the vehicle (such as race car before and during a race). There is also a need for a method and apparatus for quickly and easily retrofitting existing vehicles (such as race cars) with a vehicle braking system brake bias adjuster which enables the driver to quickly and easily set, adjust, and determine the relative brake bias or brake bias setting of the vehicle (such as the race car before and during a race, and after a race for reference, or for the next time on that particular racetrack).

It should also be appreciated that many forms of racing include racing on a dry track and also at times racing on a drying track such as in dirt or off road racing or in road racing, in drizzle or rain. This requires more braking force to be added, relatively, to the rear brakes, and thus presents an additional need for the present disclosure.

It should further be appreciated that when fuel is added to a race car during an event, the brake force normally is changed to add more brake force to the end of the car with the fuel tank. When complicated with changing drivers, there is even more of a need for a reference for the brake force as provided by the present disclosure.

Accordingly, there is a need to solve these problems, to assist the driver in all of these situations, and to enable the driver to know how the brake ratio is set at all times.

SUMMARY

Various embodiments of the present disclosure are directed a brake bias adjuster of a vehicle braking system which includes a brake bias adjustment knob assembly having a visible brake bias ratio indicator which enables the driver to quickly and easily verify the brake bias relative setting while the vehicle is in motion, and to set, adjust, and determine the relative brake bias or brake bias setting (i.e., the ratio of front to rear brake biasing) of the vehicle (such as a race car) before and while driving the vehicle (such as before and especially on a pace lap prior to the race starting or during a race). The brake bias adjustment knob assembly of the present disclosure can be employed for front to rear brake bias adjusters as well as for right to left brake bias adjusters. It should be appreciated that the present disclosure primarily discusses example front to rear brake bias adjusters, but such disclosure is not meant to limit the present invention.

More specifically, various embodiments of the present disclosure provides a vehicle brake bias adjuster with a brake bias adjustment knob assembly having a visible brake bias ratio indicator which indicates the exact amount of brake bias toward the front brakes or the rear brakes, or if the bias is set to a position the driver is familiar with.

In one example embodiment, the brake bias adjuster having the visible brake bias ratio indicator of the present disclosure includes: (a) a biasing mechanism attachable to a bias bar element or mechanism of a pedal assembly of a vehicle; (b) a brake bias adjustment knob assembly attachable to a dashboard or in a convenient, visible location inf the vehicle; and (c) a connection cable or flexible shaft attachable at one end to the brake bias adjustment knob and at the other end to the biasing mechanism. The brake bias adjustment knob assembly of this example embodiment includes: (a) a knob; (b) a plurality of springs; (c) a plurality of ball bearings or round balls; (d) a cover plate; (e) a ring gear; (f) a index gear; (e) a base plate; (f) a mounting plate; and (g) a plurality of dashboard fasteners such as a plurality of bolts and a plurality of nuts. The mounting plate defines: (i) a central cable hole; (ii) a plurality of indents around the central cable hole; and (iii) a plurality of dashboard attachment holes. The base plate includes: (i) a generally flat cylindrical base plate body which defines a central opening; (ii) an index gear axle extending upwardly from the base plate body; and (iii) a plurality of bolts or studs or welded studs extending downwardly from the base plate body. The index gear includes a index gear body and a plurality of gear teeth outwardly extending from the index gear body and is mounted on the index gear axle. The ring gear includes a cylindrical ring gear body having a downwardly extending cylindrical side wall and an angled upwardly and inwardly extending cylindrical top wall. The cylindrical side wall includes a plurality of gear teeth which are configured to sequentially mate with the teeth of the index gear. The cylindrical top wall displays a plurality of different brake bias indication symbols on the front face (and/or the out perimeter). The knob has an exterior structure which includes a body having an upper portion and a lower portion connected to the upper portion, two teeth extending outwardly from the lower portion. The teeth are configured to selectively engage a plurality of the teeth of the index gear such that a full rotation of the knob causes a precise partial rotation of the index gear which causes a partial rotation of the ring gear. The knob has an interior structure which defines a central hole configured to receive an end of a connection cable of brake bias adjuster, and which defines two holes each configured to receive and hold a spring and a ball bearing. These two holes can be threaded to enable access to the spring/ball assembly and for maintenance or adding or removing spring pressure. The cover plate includes a cylindrical cover plate body having a downwardly extending cylindrical side wall and an angled upwardly and inwardly extending cylindrical top wall. The cylindrical side wall is attached to the base plate to maintain the knob, the ring gear, and the index gear attached to the base plate. The top wall of the cover plate defines a window which reveals one of the brake bias indication symbols on the ring gear to indicate the relative front to rear brake bias.

In another example embodiment, the brake bias adjuster of the present disclosure includes: (a) a knob; (b) one or more knob fasteners which secure the knob to the connection cable; (c) a cover plate or housing; (d) a ring gear; (e) a compound gear; (f) a compound gear mount or axle; (g) an idler gear; (h) an idler gear mount or axle; (i) a base plate; (j) a new or existing mounting plate; and (h) a plurality of dashboard fasteners. This assembly can also include one or more retention devices for the gears such as devices which act as axles or pivots. The knob in this embodiment has a generally cross shape or X shape which includes a plurality of outwardly extending protrusions or arms configured to enable the driver to grip the knob and easily choose and make a quarter rotation, a half rotation, a three-quarters rotation, a full rotation, or more than a full rotation of the knob (without the need for the driver to look at the knob). The cross configuration of the knob provides a visual and tactile reference for the driver to adjust in easily determinable quarter turns. The cross pattern is unlike any known knob in a race car, which are generally round was cylindrical. In this embodiment, the knob further includes an actuation gear extending from a lower portion of the knob. The actuation gear is configured to engage and cause rotation of the compound gear which in turn causes rotation of the idler gear which in turn causes rotation of the ring gear which causes rotation of the cover plate or housing. The front or top wall of the cover plate or housing includes a plurality of the brake bias indication symbols which indicate the amount of front or rear brake bias to the driver, and if there is no front or rear brake bias. The outer diameter of the cover plate can also or alternatively be marked with indications symbols that indicate the amount of brake bias. The outer diameter may be more easily read by the driver, depending on the position of the driver and placement of the brake bias adjustment knob assembly on the vehicle's dashboard. For night racing, a supplemental light can be installed or utilized exactly above the rotating outer cover, with the light placed at the "reference point" or near the rotating cover and therefore the knob for easy reference in dark or low light conditions.

Each of these two example embodiments enables the driver to easily and quickly verify the initial setting of the brake bias and then, if needed, set a different brake bias. Each brake bias indication symbol indicates a different exact amount of brake bias ratio (such as toward the front brakes or toward the rear brakes), or if there is no bias at all. In various embodiments, the brake bias adjustment knob assembly having the visible brake bias ratio indicator of the present disclosure indicates the specific position of the threaded fulcrum in or with respect to the number or quantity of turns, which is generally 12 to 16 full turns from one end of the threaded pivot remaining on the threaded fulcrum of the biasing mechanism of the brake bias adjuster.

The present disclosure also provides a method and apparatus for retrofitting an existing vehicle such as a race car with a cable driven brake bias adjustment knob assembly which enables the driver to quickly and easily set, adjust, and determine the relative brake bias or brake bias setting (such as the ratio of front to rear brake biasing or right to left biasing, or both, with two brake bias adjustment knob assemblies installed) of the vehicle such as the race car before and during a race.

The present disclosure also provides a vehicle braking system including a brake bias adjuster which includes a brake bias adjustment knob assembly.

The present disclosure also provides a vehicle having a vehicle braking system including a brake bias adjuster which includes a brake bias adjustment knob assembly.

Additional features and advantages are described in, and will be apparent from, the following Detailed Description and the Figures.

BRIEF DESCRIPTION OF THE DRAWINGS

FIG. 12A is a perspective view of the vehicle braking system brake bias adjuster of another example embodiment of the present disclosure, and illustrating a brake pedal assembly having a biasing mechanism, a brake bias adjustment knob assembly, a connection cable connected to the brake bias adjustment knob assembly and the biasing mechanism, and a first "Front V Rear" label attached to the dashboard (or mounting plate).

FIG. 13 is a partial exploded perspective view of part of the example brake bias adjustment knob assembly of FIG. 12.

FIG. 14B is cross-sectional view of the example brake bias adjustment knob of FIG. 14A taken substantially along line 14B-14B of FIG. 14A.

DETAILED DESCRIPTION OF EXAMPLE EMBODIMENTS

Figure 1:
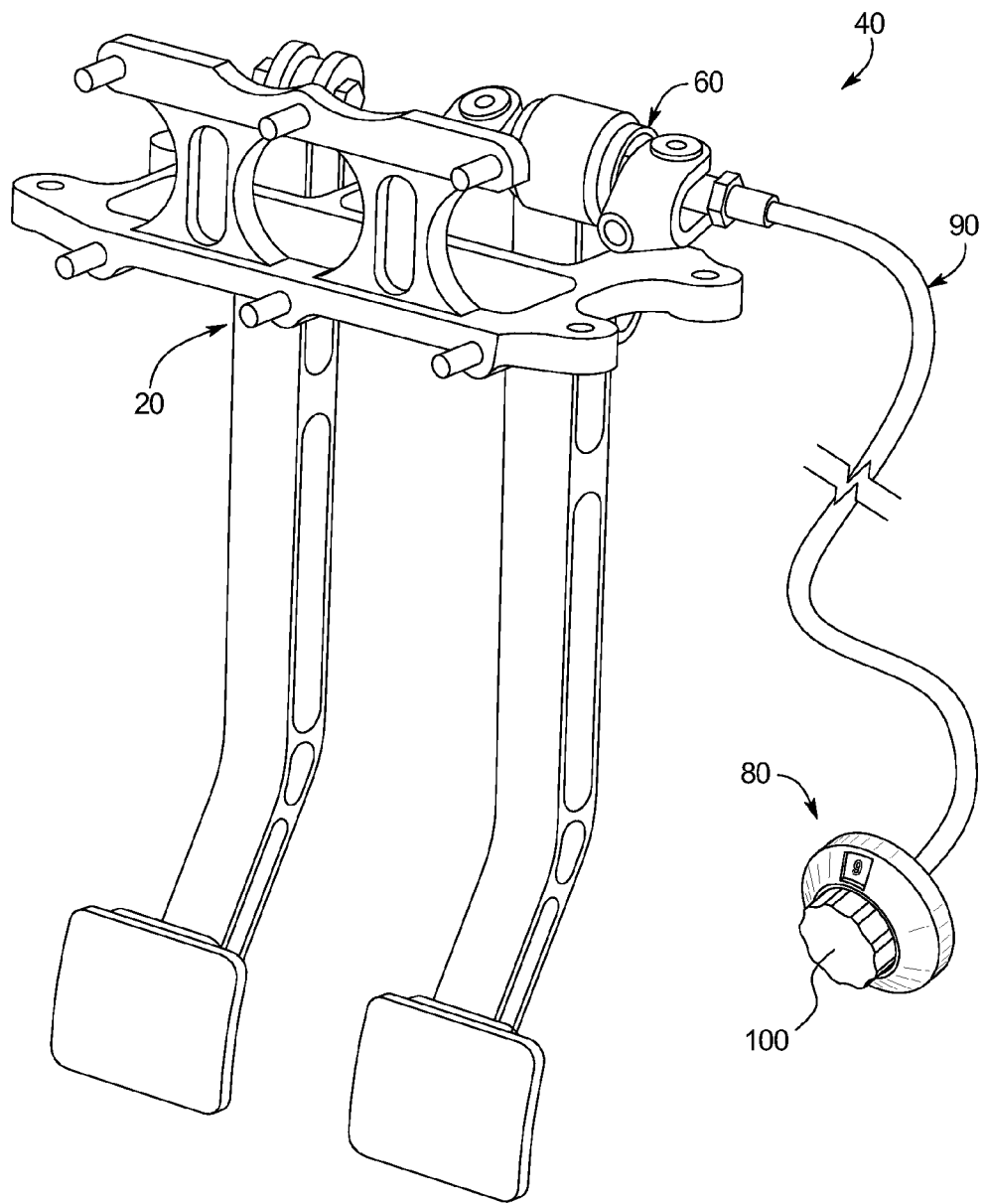
FIG. 1 is a perspective view of the vehicle braking system brake bias adjuster of one example embodiment of the present disclosure, and illustrating a brake pedal assembly, having a biasing mechanism, a brake bias adjustment knob assembly, and a connection cable connected to the brake bias adjustment knob assembly and the biasing mechanism.
Figure 2:
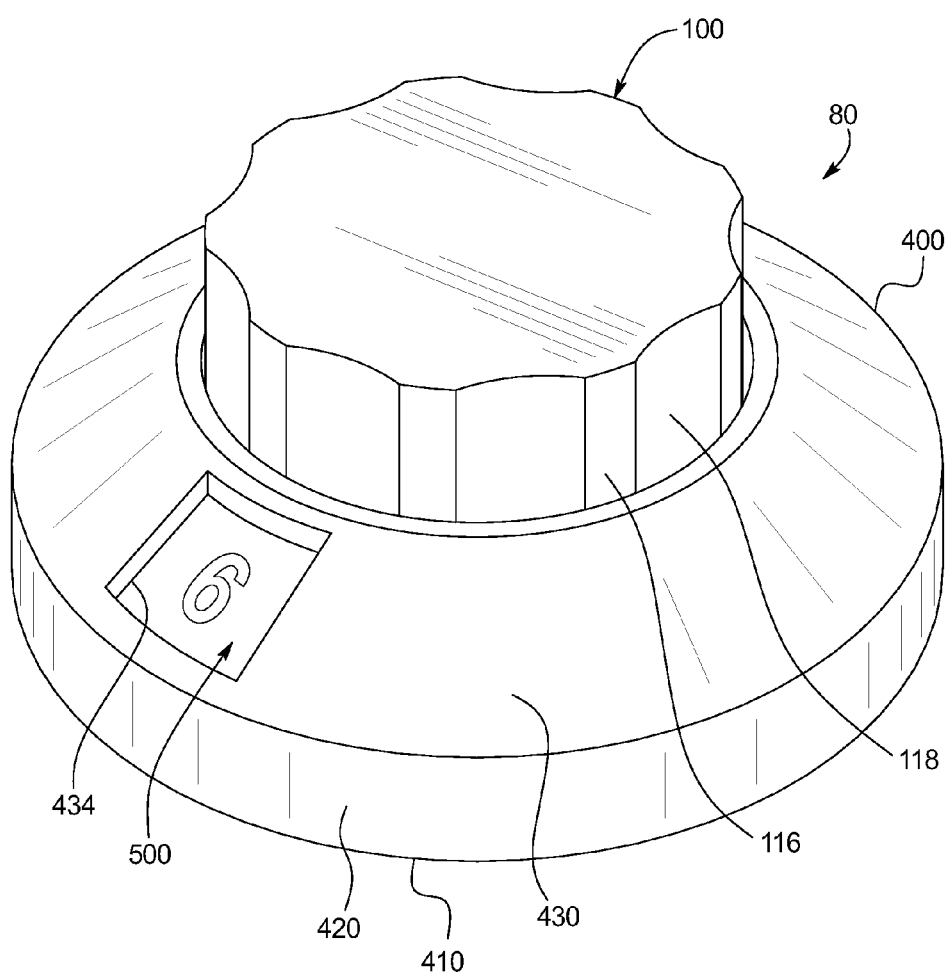
FIG. 2 is a top perspective view of part of the brake bias adjustment knob assembly of FIG. 1.

Referring now to the drawings, one specific example embodiment of the vehicle braking system brake bias adjuster of the present disclosure is illustrated in FIG. 1, and generally indicated by numeral 40. The brake bias adjuster of the present disclosure enables the driver to quickly and easily set, adjust, and accurately determine a bias or ratio of leverage or relative pressure between the front or first brakes and the rear or second brakes of the braking system of a vehicle (such as a race car). Although not described in detail herein, the brake bias adjuster of the present disclosure can also be configured to enable the driver to quickly and easily set, adjust, and accurately determine a bias or ratio of leverage or relative pressure between the right (first) front brakes and left (second) front brakes of the braking system of a vehicle (such as a race car).

Figure 12B:
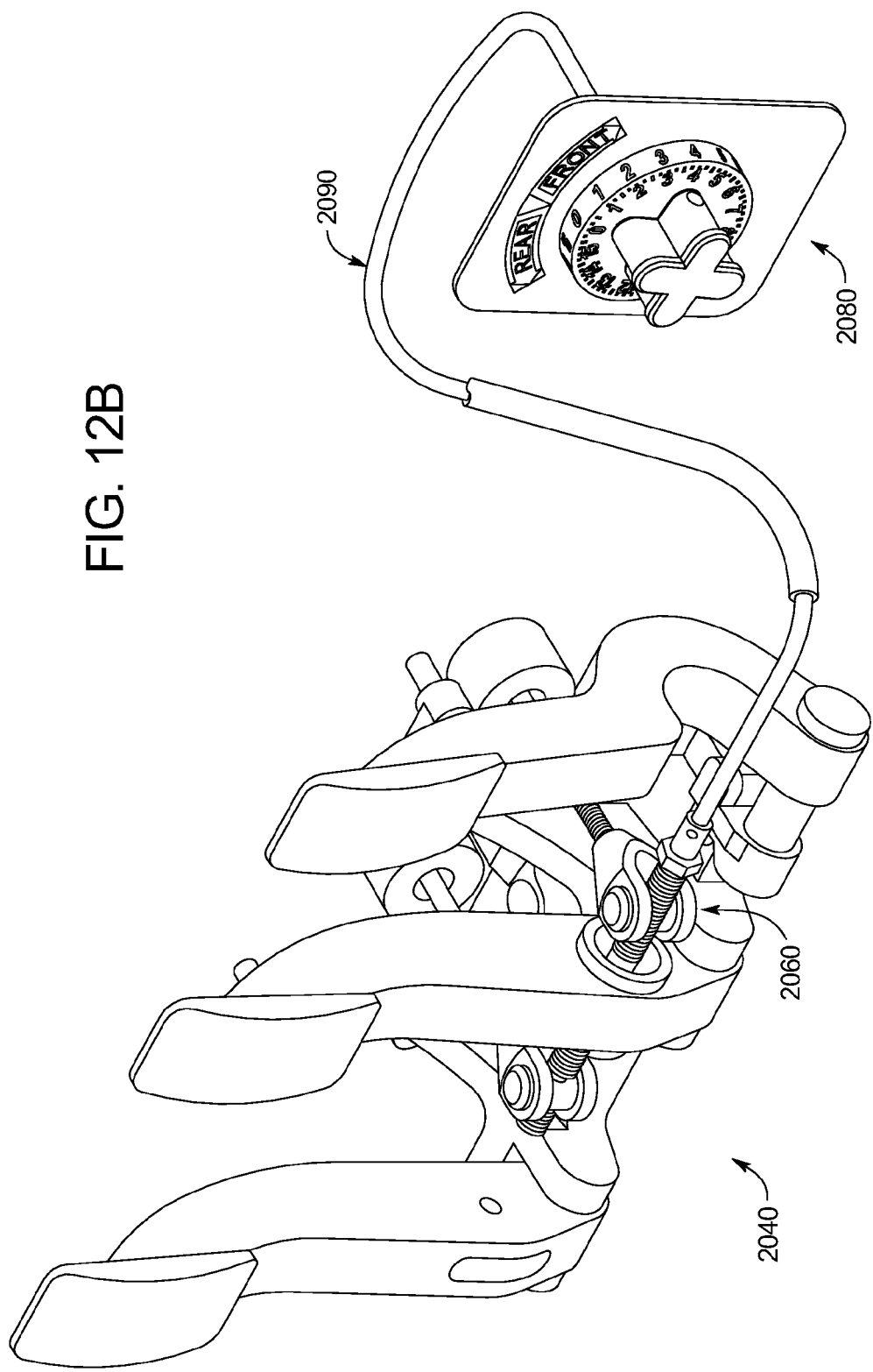
FIG. 12B is a perspective view of the vehicle braking system brake bias adjuster of another example embodiment of the present disclosure, and illustrating a brake pedal assembly having a biasing mechanism, a brake bias adjustment knob assembly, a connection cable connected to the brake bias adjustment knob assembly and the biasing mechanism, and a second "Rear V Front" label attached to the dashboard (or mounting plate).

The example brake bias adjuster 40 of this illustrated example embodiment generally includes: (a) a biasing mechanism 60 attached to a pedal assembly 20 of a vehicle (not shown); (b) a brake bias adjustment knob assembly 80 attachable to a dashboard (not shown) of the vehicle (not shown); and (c) a connection cable or flexible shaft 90 attached at one end to the brake bias adjustment knob assembly 80 and at the other end to the biasing mechanism 60. The biasing mechanism 60 in this illustrated embodiment includes: (a) a threaded fulcrum device between the two master cylinders of the brake pedal assembly; (b) a pivoting bearing in the middle of the fulcrum that is configured to move or slide back and forth relative to the fulcrum, which is attached to the brake pedal assembly, either mounted above the drivers feet or mounted below the driver's feet; and (c) a bolt-like device or threaded shaft which turns the threaded pivot on the internally threaded fulcrum clevis mounts that individually actuate both the front and rear brakes. As further described below, the brake bias adjustment knob assembly 80 includes a knob 100. When knob 100 of the brake bias adjustment knob assembly 80 rotates, the connection cable 90 rotates, and the threaded shaft rotates, which causes leverage or bias between the front and rear brakes to change. The brake bias adjustment knob assembly 80 indicates the relative amount of brake bias toward the front brakes, the rear brakes, or if there is no bias at all. More specifically, the brake bias adjustment knob assembly 80 indicates the position of the threaded shaft in turns from one end of the threaded pivot remaining on the threaded fulcrum of the biasing mechanism. This enables the driver to quickly and easily set, adjust, and determine the brake bias and eliminate the need for the driver to remember at all times how the brake bias adjuster is set (including the original setting and all adjustments made to the front to rear bias by the driver of the vehicle such as before and during a race). It should be that FIG. 1 shows a pendulum or hanging pedal system, and that the pedal assembly can be inverted through a configuration which enables floor mounting of the entire assembly as generally shown in FIGS. 12A and 12B.

Turning now to FIGS. 2, 3, 4, 5, 6, 7, 8, and 9, the brake bias adjustment knob assembly 80 of this illustrated example of present disclosure includes: (a) a knob 100; (b) springs 200 and 210; (c) ball bearings 300 and 310; (d) a cover plate 400; (e) a ring gear 500; (f) a index gear 600; (e) a base plate 700; (f) a mounting plate 800; and (g) a plurality of dashboard fasteners such as bolts 900 and 910 and nuts 920 and 930.

Figure 5:
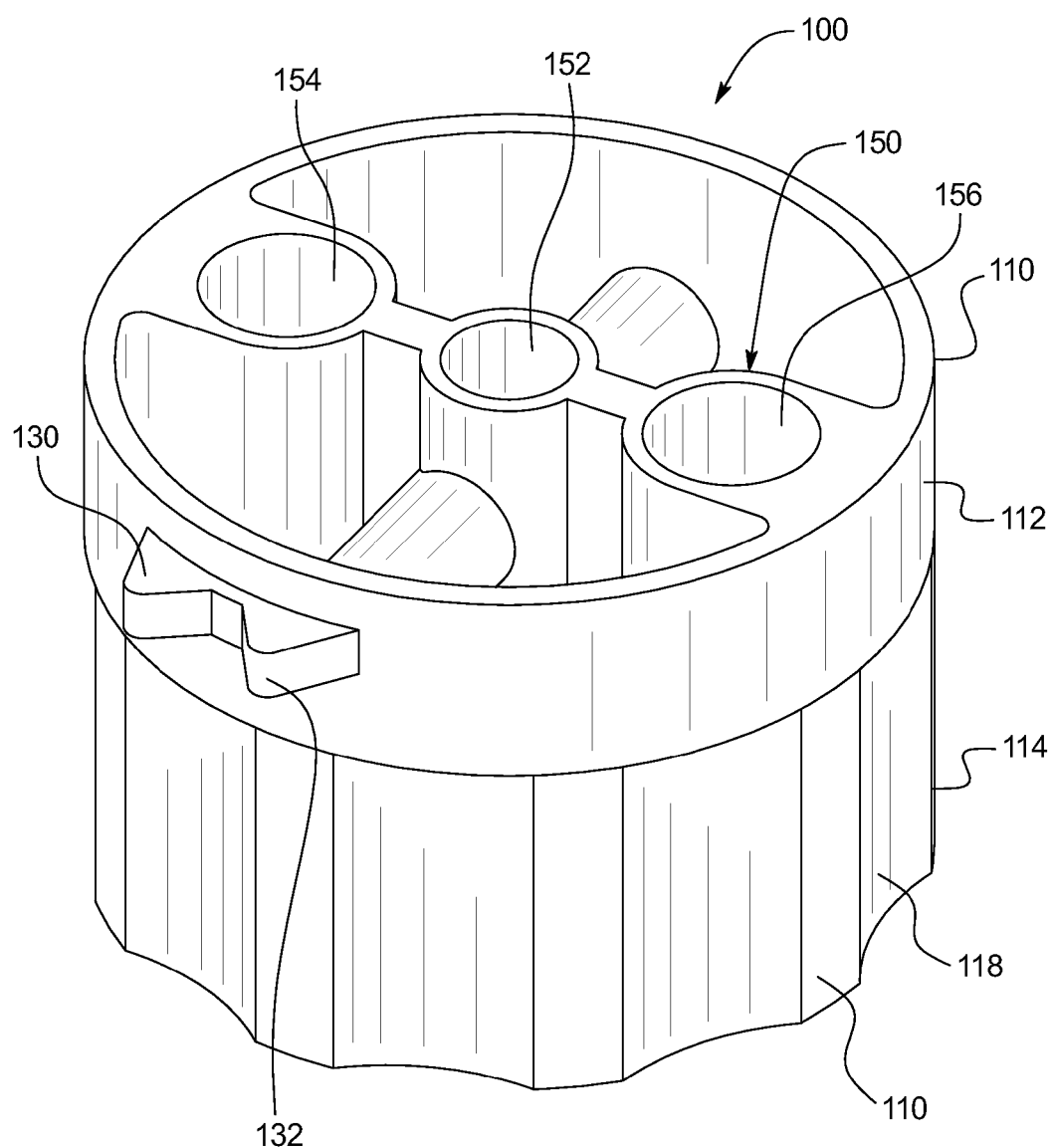
FIG. 5 is a bottom perspective view of the knob of the brake bias adjustment knob assembly of FIG. 1.
Figure 6:
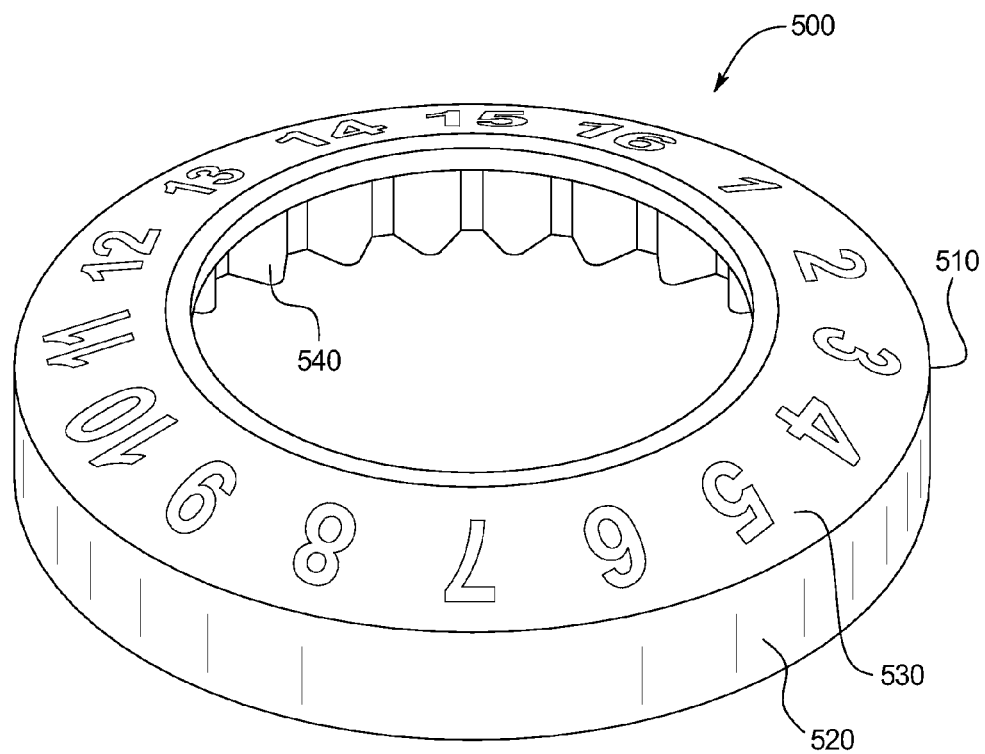
FIG. 6 is a top perspective view of the ring gear of the brake bias adjustment knob of FIG. 1.
Figure 7:
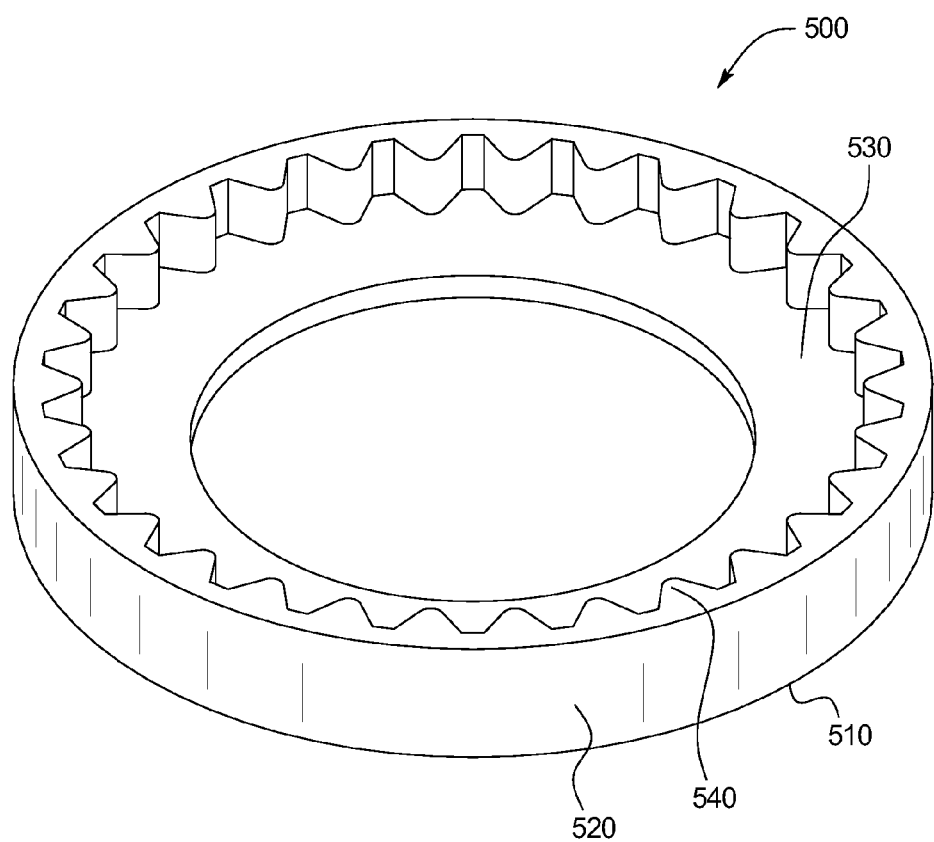
FIG. 7 is a bottom view of the ring gear of the brake bias adjustment knob assembly of FIG. 1.
Figure 8:
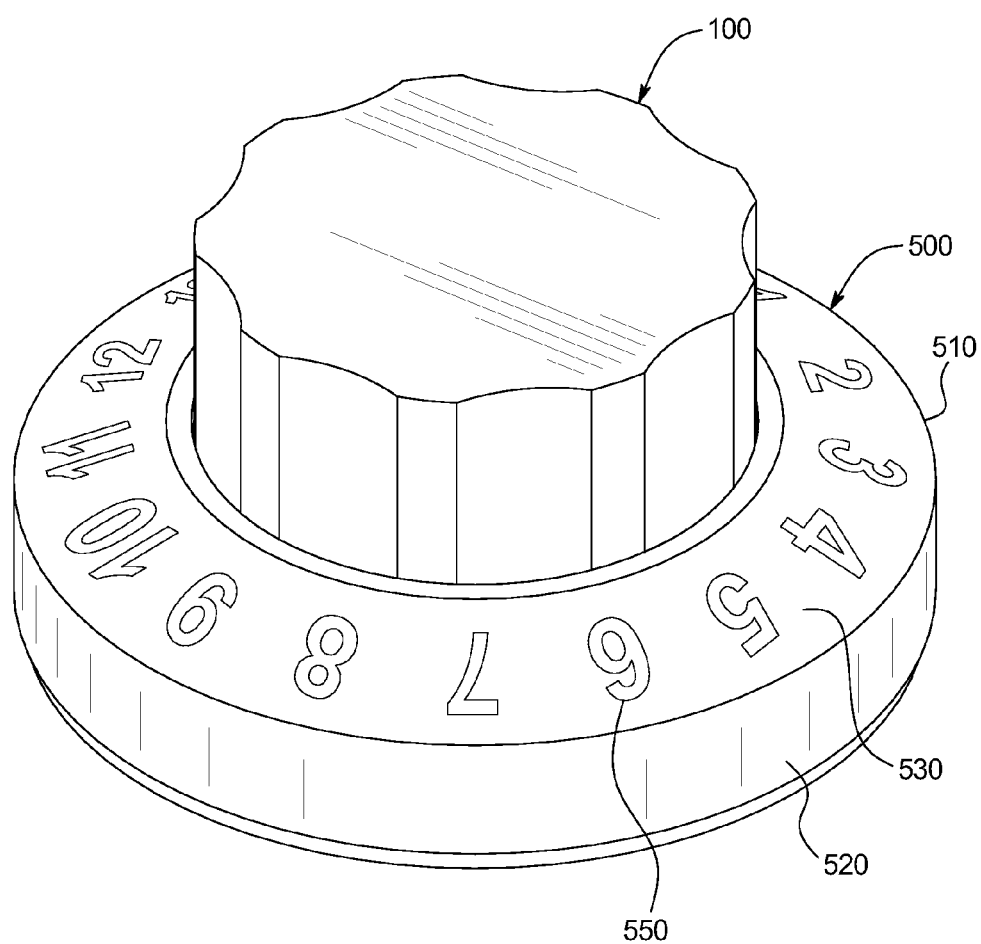
FIG. 8 is a top perspective view of the knob assembled with the ring gear of the brake bias adjustment knob assembly of FIG. 1.

More specifically, the knob 100 is configured to be rotated by the driver of the vehicle to rotate the connection cable 90 to change the brake bias. The knob 100 has a knob body having an exterior structure (best shown in FIGS. 2, 3, 4, 5, and 8) which includes a generally cylindrical body 110 having an upper portion 114 and a base or lower portion 112 connected to the upper portion 114. The upper portion 114 has a plurality of protrusions 116 and defines a plurality of indentations 118 which facilitate gripping of the knob 100 by the driver. The knob 100 includes one or more teeth such as the two teeth 130 and 132 which extend outwardly from the base or lower portion 112. These teeth 130 and 132 are configured to each engage and cause rotation of the index gear 600 (as best shown in FIG. 5) which in turn causes rotation of the ring gear 500 (as also best shown in FIG. 5) as further discussed below.

In this illustrated embodiment, the teeth 130 and 132 engage the teeth 620 of the index gear 600 once for every revolution of the knob 100, which in turn will cause rotation of the ring gear 500 one brake bias indication symbol interval as further discussed below. In other words, as further discussed below, the ring gear 500 will rotate to change the displayed brake bias indication symbol for every complete full rotation of the knob 100.

This illustrated knob 100 has two set screw receiving channels including illustrated channel 140 that enable set screws (not shown) to be used to attach the knob 100 to the end (not shown) of the end of the connection cable 90 and for easy calibration of the knob 100 relative to the connection cable 90. This also enables the driver (or a mechanic) to initially set the neutral position, or a position number that corresponds to either full front brakes or full rear brakes, at a specific number location on the ring gear 500.

Figure 3:
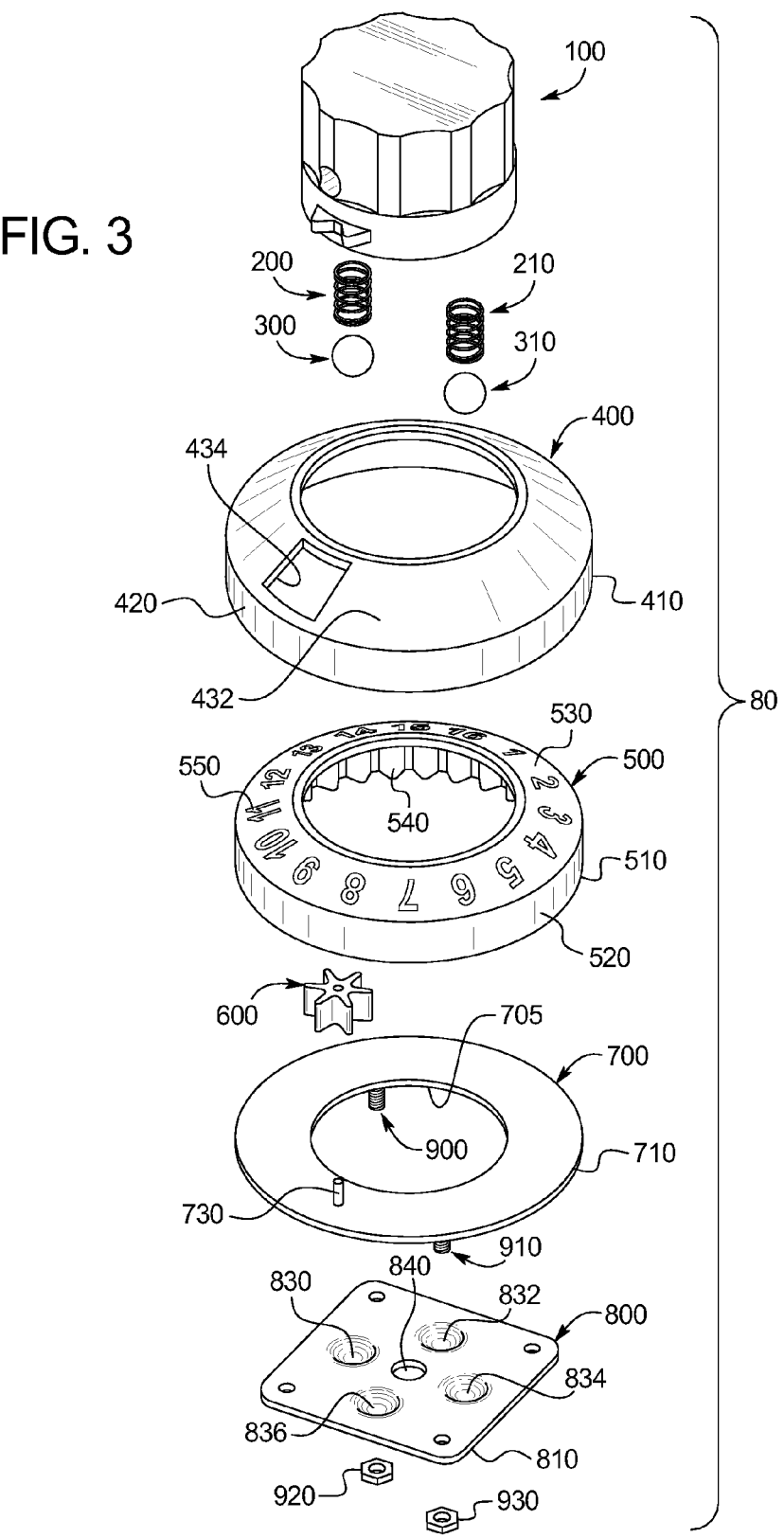
FIG. 3 is an exploded top perspective view of the brake bias adjustment knob assembly of FIG. 1.
Figure 4:
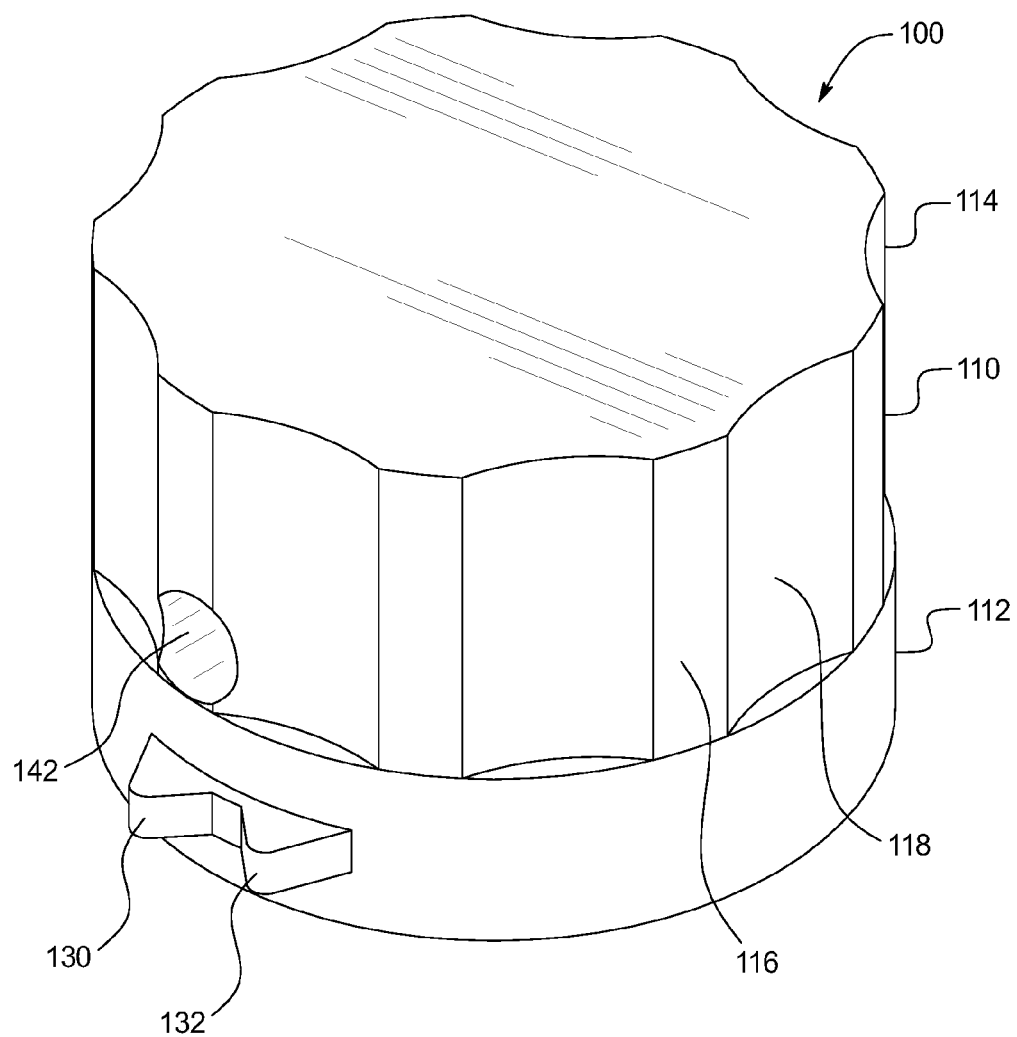
FIG. 4 is a top perspective view of the knob of the brake bias adjustment knob assembly of FIG. 1.

The knob body of the knob 100 also includes an interior structure 150 (best shown in FIGS. 5 and 8) which defines a central cylindrical hole 152 configured to receive the end (not shown) of the connection cable 90. The interior structure 150 defines two cylindrical holes 154 and 156 (on both sides of the central hole 152) and configured to respectively receive and hold the springs 200 and 210 and the ball bearings 300 and 310. These spring and ball mechanisms work with the detents 830, 832, 834, and 836 formed in the base plate 700 (as best shown in FIG. 3) to provide the driver a tactile feel and at least some audible determinant for motion of the knob, for each quarter rotation of the knob 100 as further explained below.

The knob 100 in this illustrated embodiment is made from a suitable molded plastic. However, it should be appreciated that the knob can be made from other suitable materials and in any suitable manner. It should also be appreciated that the knob can be of other suitable configurations and sizes, including fast adjustment levers (not shown) which enable even faster turning of the knob.

The cover plate 400 (best shown in FIGS. 2 and 3) is attachable to the base plate 700 and holds the ring gear 500 in place without applying resistance to the knob 100 or the ring gear 500. This enables smooth rotation of the knob 100 and of the ring gear 500. More specifically, this illustrated embodiment, the cover plate 400 includes a cylindrical cover plate body 410 having a downwardly extending cylindrical side wall 420 and an angled upwardly and inwardly extending cylindrical top wall 430. The cylindrical wall 420 is configured to snap fit with the body 710 of the base plate 700 to maintain the knob 100, the ring gear 500, and the index gear 600 attached to the base plate 700. It should be appreciated that other suitable attachment mechanisms may be employed in accordance with the present disclosure. In one alternative embodiment where the base plate is steel, the base plate will be coated with a suitable coating such as PTFE for providing a low friction surface, a consistent tactile force, and corrosion resistance.

The top wall 430 of the cover plate 400 defines a relatively small opening or window 434 which is configured to reveal one of the brake bias indication symbols such as one of the different numbers on the ring gear 500 which indicates the relative front to rear brake bias. In this example embodiment, the front to rear brake bias is indicated by the symbols or numbers 1 through 16, where 1 represents the front most brake bias and 16 represent the rear most brake bias. Conversely, a driver or mechanic can choose to the opposite where the maximum For one setting, full front brake bias is 16 and full rear brake bias is 1. However, if the front and rear master cylinders are mounted in the opposite manner, the symbol or number displayed through the window of 434 would be a different value. It should be appreciated that the symbol or number progresses as more front brake bias is selected. The opening or window 434 only displays one number at a time in this illustrated embodiment. In alternative embodiments, the size of the window can be larger such that more than one brake bias indication symbol can be seen to remind the driver which way to turn the knob 100 to change the brake bias in the desired direction. It should be appreciated that the brake bias indication symbols can be any suitable symbols.

In other various embodiments, a fine tuning knob engraving system is incorporated so that the approximately 360 degrees of rotation can be noted in a percentage (such as 1 to 100) or in 10% increments which provides for finer adjustment so the driver can select and reselect a finer adjustment of the bias and between the digits. For instance, the assembly can indicate quarter turn adjustments as well as full 360 degree rotations.

The cover plate in this illustrated embodiment is made from a suitable spun mild steel. However, it should be appreciated that the cover plate can be made from other suitable materials and in any suitable manner. It should also be appreciated that the cover plate can be of other suitable configurations, including a fast rotation handle adapter and other sizes to accommodate smaller or larger vehicle dashboards or control.

The ring gear 500 includes a cylindrical ring gear body 510 having a downwardly extending cylindrical side wall 520 and an angled upwardly and inwardly extending cylindrical top wall 530. The inner surface of the cylindrical side wall 520 includes a plurality of gear teeth 540. These teeth 540 are configured to mate with the teeth of the index gear 600. The ring gear 500 includes or displays the brake bias indications symbols numbers 550. In this illustrated embodiment, the ring gear 500 is configured to rotate the length of two teeth for every full rotation of the knob 100. The length of two teeth corresponds to one brake bias indication symbol or number increment in this example embodiment. Accordingly, for every full rotation of the knob 100, the ring gear 500 will either increase or decrease one number 550 shown in the display window 434 of the cover 400. It should also be appreciated that the numbering system can be reversed. It should further be appreciated that the symbols or numbers can be fluorescent and that the system can include other methods or mechanisms for lighting the entire assembly or least the numbered window for night driving such as night racing.

The ring gear 500 in this illustrated embodiment is made from a suitable molded plastic. However, it should be appreciated that the ring gear can be made from other suitable materials and in any suitable manner. It should also be appreciated that the ring gear can be of other suitable configurations and markings and sizes.

It should be appreciated that suitable adhesive labels, decals, or stickers in the form of a curved arrow that can be provided in accordance with the present disclosure to enable the driver quick reference as to which way to turn the knob to add or subtract braking force that the driver desires. These labels, decals, or stickers can indicate either clockwise or counterclockwise rotation for front braking and also for rear braking. It should also be appreciated that certain cars have master cylinders mounted front to the right of the brake pedal and some are reversed and that multiple different labels, decals, or stickers (such as both directional labels, decals, and sticker arrows) can be provided to account for this in accordance with the present disclosure.

Figure 9:
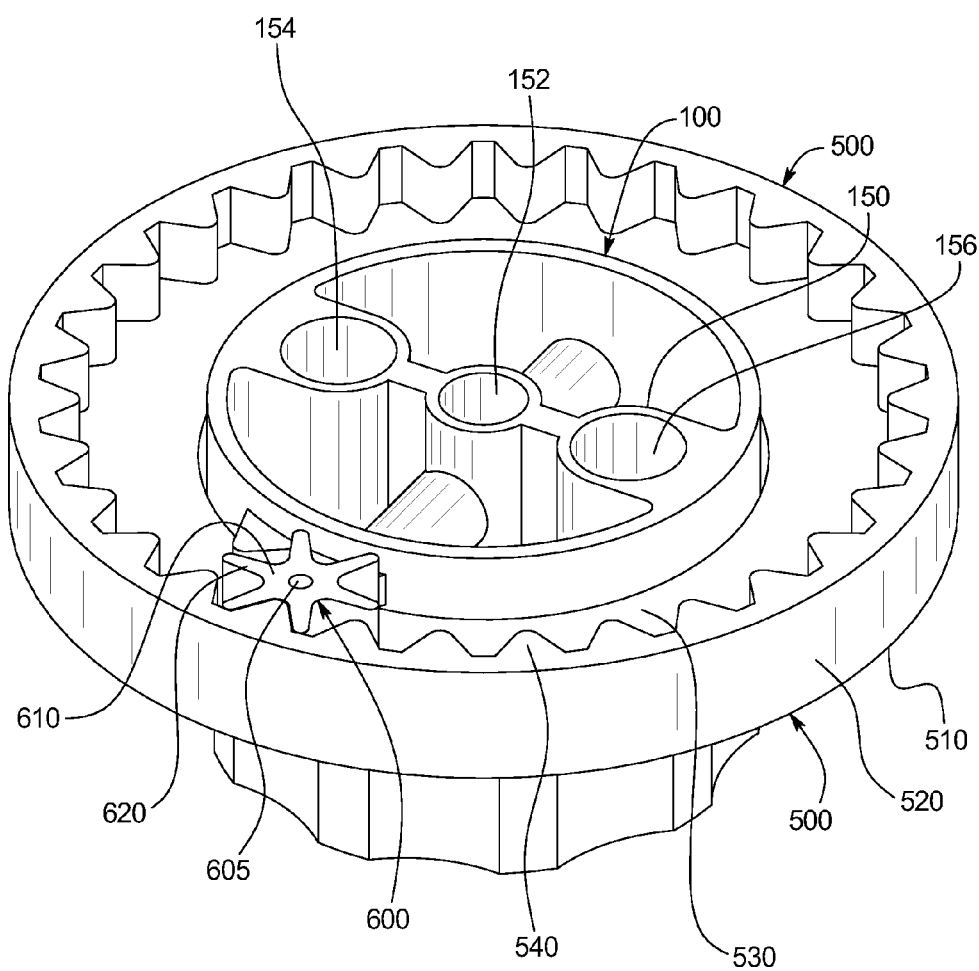
FIG. 9 is a bottom perspective view of the knob assembled with the, the ring gear, and the index gear of the brake bias adjustment knob assembly of FIG. 1.

The index gear 600 has an index gear body 610 and a plurality of outwardly extending teeth 620 (best shown in FIG. 9). The body 610 defines a central hole 605 for mounting on the index gear axle 730 extending upwardly from the base plate 700 as best shown in FIG. 3. The teeth 620 are configured to engage and mate with the teeth 540 of the ring gear 500 to cause rotation of the ring gear 500. The teeth 620 are also configured to be selectively engaged by and mate with the teeth 130 and 132 of the knob 100 such that a full rotation of the knob cause a partial rotation (such as 120 degrees) of the index gear 600 which in turn causes a partial rotation (i.e., two teeth lengths or 22.5 degrees) of the ring gear 500 in this illustrated embodiment.

The index gear 600 in this illustrated embodiment is made from a suitable molded plastic. However, it should be appreciated that the index gear can be made from other suitable materials and in any suitable manner. It should also be appreciated that the index gear can be of other suitable configurations and sizes and coated with low friction, anti wear coatings.

The base plate 700 includes a generally flat cylindrical base plate body 710 which defines a central opening 705. The index gear axle 730 extends upwardly from the base plate 700 as best shown in FIG. 3. Two fasteners such as welded studs or bolts 900 and 910 each extend downwardly from the base plate 700 and are employed to attach the entire brake bias adjustment knob assembly 80 to the dashboard (not shown) of the vehicle (not shown) such as a race car. In this illustrated embodiment, the bolts 900 and 910 are welded to the bottom of the base plate 700. The base plate 700 connects and is bonded to with suitable adhesives or fastening devices with the cover 400 to hold all the parts of the brake bias adjustment knob assembly 80 together. The base plate 700 is also configured to coact with the mounting plate 800 for attaching these parts to a dashboard, and to work with the mounting plates of existing brake bias adjustment knob assemblies for retrofitting vehicles as further described below.

The base plate 700 in this illustrated embodiment is made from a suitable metal such as mild steel or stainless steel. However, it should be appreciated that the base plate can be made from other suitable materials and in any suitable manner. It should also be appreciated that the base plate can be of other suitable configurations and sizes. It should be appreciated that the base plate can be coated with a low friction, anti-wear, and corrosion resistant coating as mentioned above.

The illustrated mounting plate 800 includes a generally square plate 810 which defines a central cable hole 840, four space apart indents 830, 832, 834, and 836 positioned around the center cable hole 840, and four dashboard attachment holes at the respective corners. The central cable hole 840 enables the connection cable 90 to extend through the mounting plate to the knob 100. The space apart indents 830, 832, 834, and 836 are configured to sequentially each receive the spring biased ball bearings 300 and 310, such that each time the knob 100 rotates a quarter turn or ninety degrees, the balls 300 and 310 move out of two of the spaced apart indents and then extend into another two of the space apart indents, thereby providing a tactile feedback for the driver without the need for the driver to look at the knob 100. It should be appreciated that other suitable configurations of base plate 800 can be employed, such as including an eight detent plate that has eight positions (or more) for particular adaptations.

The mounting plate 800 in this illustrated embodiment is made from a suitable metal such as mild steel or stainless steel. However, it should be appreciated that the mounting plate can be made from other suitable materials and in any suitable manner. It should also be appreciated that the mounting plate can be of other suitable configurations and sizes. It should be appreciated that the mounting plate can be coated with a low friction, anti-wear, and corrosion resistant coating.

It should also be appreciated that the respective sizes of various of the components may be varied in accordance with the present disclosure. For example: (1) the size of the teeth on the knob 100, index gear 600 and ring gear 500 may vary; (2) the height of the knob 100 may be increased to enable easier rotation of the knob 100; and (3) the height of the cylindrical wall 420 may be increased to provide a better snap fit with the base plate body 710.

Installation on Completely New Vehicle

In one embodiment, to install a brake bias adjustment knob assembly 80 of the present disclosure on a vehicle (such as a race car) which does not have a brake bias adjustment knob, the installer attaches the mounting plate 800 to dashboard using two rivets (not shown) extending through the dashboard attachment holes in opposing corners in the mounting plate 800. The installer then attaches the base plate 700 to the mounting plate 800 by inserting the two bolts 900 and 910 (extending from the new base plate 700) through the other two dashboard attachment holes in opposing corners of the mounting plate 800. The installer attaches the two locking, vibration resistant nuts 920 and 930 to the bolts 900 and 910 to hold the base plate 700 onto the mounting plate 800 and the dashboard (not shown) of the vehicle (not shown). It should be appreciated that the nuts can be lock nuts that multiple nuts can be employed, and that washers or lock washers can also be employed. It should also be appreciated that the mounting plate may be attached to the dashboard in other suitable manners. It should further be appreciated that the base plate may be attached to the mounting plate and the dashboard in other suitable manners. The installer than attaches the rest of the components of the brake bias adjustment knob assembly 80 to the base plate 700. More specifically, index gear 600 is mounted on the index gear axle 730, the knob 100, the springs 200 and 210, ball bearings 300 and 310 are suitably positioned and knob 100 is attached to the end (not shown) of the connection cable 90 using the set screws (not shown), the ring gear 500 is positioned over and in engagement with the index gear 600, and the cover plate 400 is attached to the base plate 700. It should be appreciated that the installer installs the brake bias adjustment knob assembly so that it is either at 1 or 16 depending on the setting of the front brake bias or rear brake bias and the location of the master cylinders.

Installation on Existing Vehicle

In one embodiment, to install a brake bias adjustment knob assembly of the present disclosure on an existing vehicle (such as a race car) with a commercially available brake bias adjustment knob, the installer turns the existing knob all the way in one direction (i.e., either to fully front brake bias or fully rear brake bias) and removes the existing knob by taking out the set screw(s) in the existing knob and notes the position of the protruding cable end and particularly the flat portion of the protruding cable end. The installer does not remove the existing mounting plate. Rather, the installer drills out two of the rivets that hold that existing mounting plate to the dashboard (not shown) of the vehicle (not shown). The installer then attaches the base plate 700 and the rest of the brake bias adjustment knob assembly 80 to that existing mounting plate by inserting the two bolts 900 and 910 (extending from the bottom of the base plate 700) through the two drilled out dashboard attachment holes in opposing corners of that existing mounting plate. The installer then attaches the two nuts 920 and 930 to the bolts 900 and 910 to hold the base plate 700 onto that existing mounting plate and the dashboard (not shown). It should be appreciated that the nuts can be lock nuts, that multiple nuts can be employed, and that washers or lock washers can also be employed.

Alternative Embodiment of Index Gear

Figure 10:
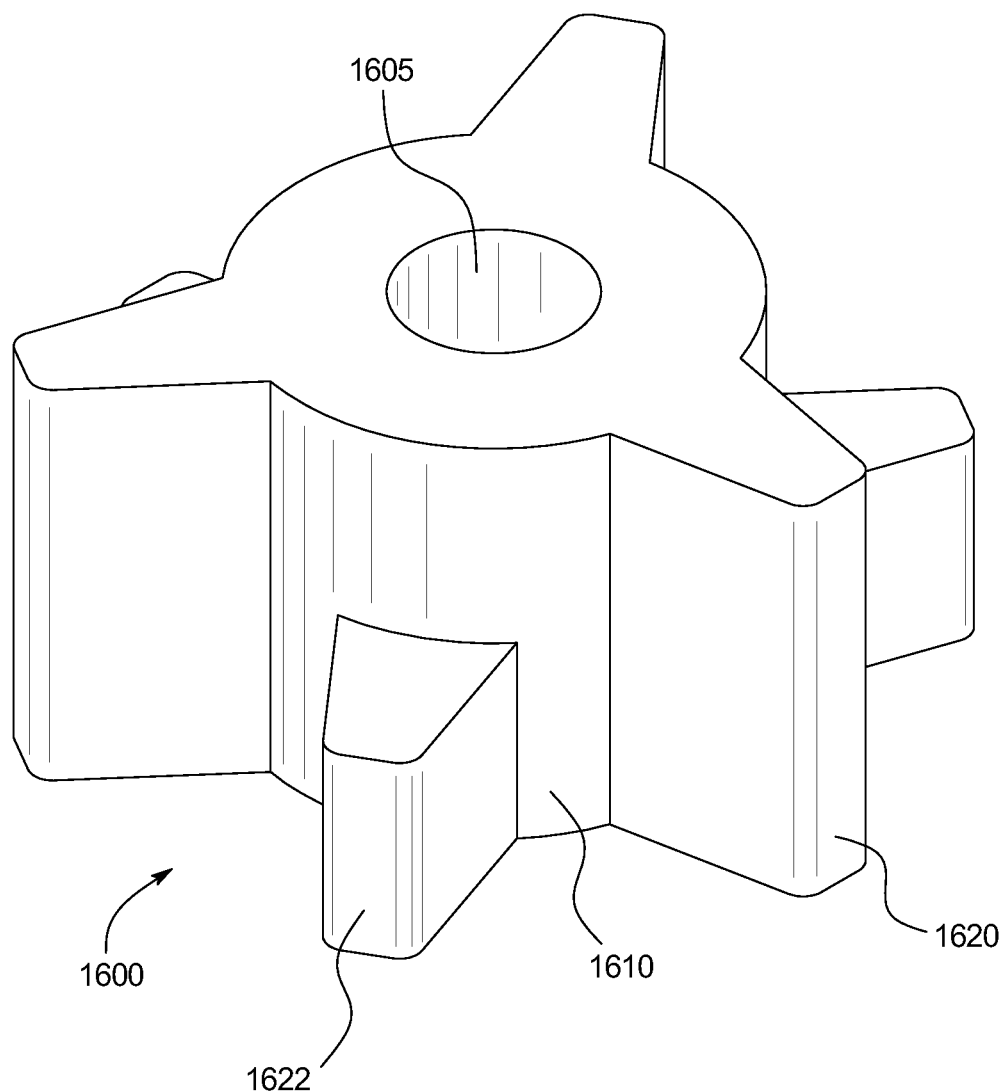
FIG. 10 is a top perspective view of the index gear of an alternative example embodiment of the brake bias adjustment knob assembly of the present disclosure.

Referring now to FIG. 10, an alternative embodiment of the index gear of the brake bias adjustment knob assembly of the present disclosure is generally illustrated and indicated by numeral 1600. The index gear 1600 has a index gear body 1610 and a plurality of outwardly extending full teeth 1620 which are configured to engage the teeth of the ring gear and a plurality of outwardly extending half teeth 1622 which are configured to be engaged by the body of the knob (illustrated in FIG. 11 and further explained below). The body 1610 defines a central hole 1605 for mounting on the index gear axle extending upwardly from the base plate 700 as best shown in FIG. 3. The teeth 1620 and 1622 are configured to engage and mate with the teeth 540 of the ring gear 500 to cause rotation of the ring gear 500. The teeth 1620 and 1622 are also configured to be selectively engaged by and mate with the teeth 130 and 132 of the knob such that a full rotation of the knob cause a partial rotation (such as 120 degrees) of the index gear 1600 which in turn causes a partial rotation (i.e., two teeth lengths or 22.5 degrees) of the ring gear in this illustrated embodiment.

The index gear 1600 in this illustrated embodiment is made from a suitable molded plastic. However, it should be appreciated that the index gear can be made from other suitable materials and in any suitable manner. It should also be appreciated that the index gear can be of other suitable configurations and sizes and coated with low friction, anti wear coatings.

Alternative Embodiment of Knob

Figure 11:
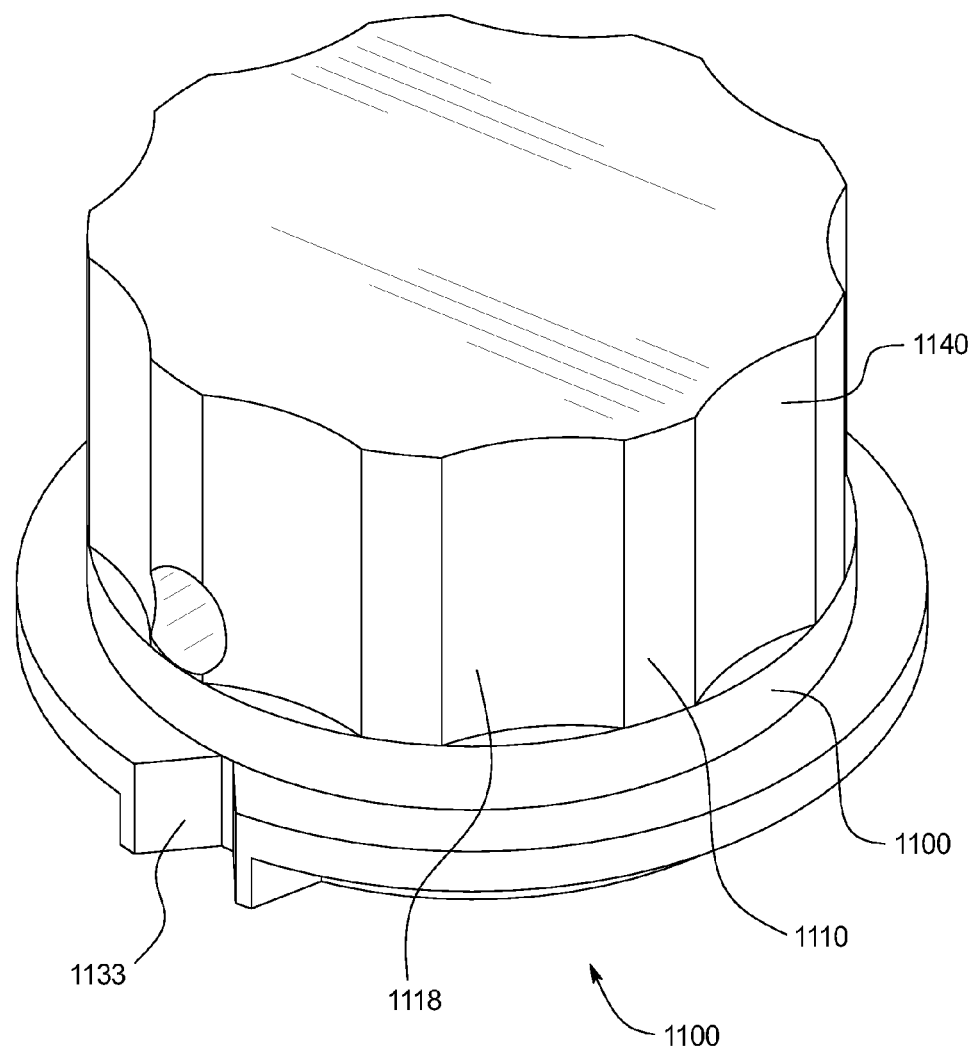
FIG. 11 is a top perspective view of the knob an alternative example embodiment of the brake bias adjustment knob assembly of the present disclosure.

Referring now to FIG. 11, an alternative embodiment of the knob of the brake bias adjustment knob assembly of the present disclosure is generally illustrated and indicated by numeral 1100. The knob 1100 is configured to be rotated by the driver of the vehicle to rotate the connection cable 90 to change the brake bias. The knob 1100 has a knob body having an exterior structure which includes a generally cylindrical body 1110 having an upper portion 1114 and a base or lower portion 1112 connected to the upper portion 1114. The upper portion 1114 has a plurality of protrusions 1116 and indentations 1118 which facilitate gripping of the knob 1100 by the driver. The knob 1100 includes one or more index gear teeth receiving slots 1133 which extend inwardly from the base or lower portion 1112 or an outwardly extending ledge or flange that defines the lower portion 1112. The walls that define the index gear teeth receiving slot are configured to each engage and cause rotation of the index gear 1600 which in turn causes rotation of the ring gear.

The knob 1100 in this illustrated embodiment is made from a suitable molded plastic. However, it should be appreciated that the knob can be made from other suitable materials and in any suitable manner. It should also be appreciated that the knob can be of other suitable configurations and sizes.

Alternative Embodiment of Brake Bias Adjuster

Turning now to FIGS. 12A, 12B, 13, 14A, 14B, 14C, 15, 16, 17, and 18, another specific example embodiment of the brake bias adjuster is illustrated and generally indicated by number 2040. The brake bias adjuster 2040 generally includes: (a) a biasing mechanism 2060 attached to a pedal assembly 2020 of a vehicle (not shown); (b) a brake bias adjustment knob assembly 2080 attachable to a dashboard 3000 (partially shown in FIGS. 15, 16, and 17) of the vehicle (not shown); and (c) a connection cable or flexible shaft 2090 attached at one end to the brake bias adjustment knob assembly 2080 and at the other end to the biasing mechanism 2060. The biasing mechanism 2060 in this illustrated embodiment includes: (a) a threaded fulcrum device between the master cylinders of the brake pedal assembly; (b) a pivoting bearing attached to and in the middle of the fulcrum that is configured to move or slide back and forth relative to the fulcrum, which is attached to the brake pedal assembly, either mounted above the drivers feet or mounted below the driver's feet; and (c) a bolt-like device or threaded shaft which turns the threaded pivot on the internally threaded fulcrum clevis mounts that individually actuate both the front and rear brakes. As further described below, the brake bias adjustment knob assembly 2080 includes a knob 2100 securely attachable to the connection cable 2090. When the knob 2100 of the brake bias adjustment knob assembly 2080 rotates, the connection cable 2090 rotates, and the threaded shaft rotates which changes the ratio of force distribution between the front and rear brakes. The brake bias adjustment knob assembly 2080 indicates the relative amount of brake bias toward the front brakes, the rear brakes, or if there is no bias at all.

More specifically, the brake bias adjustment knob assembly 2080 specifically indicates the position of the threaded shaft in turns from one end of the threaded pivot remaining on the threaded fulcrum of the biasing mechanism. For example, if the threaded fulcrum is five turns from one end of the threaded shaft, the brake bias adjustment knob assembly 2080 specifically indicates this or a representation of this to the driver. This enables the driver to quickly and easily determine the specific then current brake bias and eliminates the need for the driver to remember at all times how the brake bias adjuster is set (including the original setting and all adjustments made to the front to rear bias by the driver of the vehicle such as before and during a race). This also enables the driver to specifically change the brake bias to a specific new setting.

As further discussed below, the brake bias adjustment knob assembly 2080 can be installed such that either: (1) turning the knob 2100 clockwise increases rear brake bias and decreases front brake bias, and turning the knob 2100 counter-clockwise decreases rear brake bias and increases front brake bias (as show in FIG. 12A and indicated by the "Front V Rear" first label of the present disclosure); or (2) turning the knob 2100 clockwise increases front brake bias and decreases rear brake bias, and turning the knob 2100 counter-clockwise increases rear brake bias and decrease front brake bias (as show in FIG. 12B and indicated by the "Rear V Front" second label of the present disclosure). Thus, the present disclosure contemplates providing a two label system to account for the orientation of the brake cylinders.

This two label system (e.g., the "Front V Rear" label and the "Rear V Front" label) is thus adapted for various different cars. For example, this system is adapted for a car with the front brake cylinder which is mounted on the left side facing the front of the car in the driver's seat (i.e., mounted to the left of the center line of the brake assembly). In this configuration, if the driver turns the knob 2100 to the right, the driver will be moving the pivot bearing towards the left side of the car which shortens the distance between pivot bearing and the clevis which causes more pressure to be transmitted to the front brake cylinder. The reason this works is that the fulcrum device includes threaded cylinders. As explained above, the threaded cylinders enable the pivot threaded rod to move forward and backward. The center pivot includes a spherical bearing that enables many degrees of rotation of the bearing shell or outer portion within the tube of the brake pedal. Turning the knob turns the connection cable which turns the threaded rod which in turn moves the spherical bearing that is the actual fulcrum to the left or to the right of the brake pedal. This lengthens or shortens the distance between the front brake and rear brake respective clevis or the threaded pivot for the front and rear brake, changing the ratio of pressure between the two brake cylinders, front and rear.

As mentioned above, the brake system master cylinders can be mounted either: (a) front on the left and rear on the right, or (b) vice versa. The two label system contemplated by the present disclosure and generally illustrated in FIGS. 12A and 12B solves this problem by overcoming the problems with using a round knob with an arrow within the center of this round knob. This system enables the user to turn the knob in any amount of rotation because the present arrow label system denoting front and rear bias is mounted firmly and vertically above the knob. This system ensures that the driver is never unable to see the directional arrow as to which way to turn the knob for front and rear bias. This system overcomes the problems with arrows in the middle of the knob which may be useless when the knob is upside down. It should be appreciated that directional arrows in the middle of the knob is less useful because the driver may want a setting which is a half turn or a quarter turn which inverts the writing on the knob from the perspective of the driver. This would create confusion at minimum, and possibly could create an error in which way to turn the knob. The present disclosure enables illumination (such as in dark conditions or at night racing) because a small light can be placed above the label which would further prevent the driver from having to question where the knob is set. It should also be appreciated that the labels can be of a suitable light reflecting material.

As mentioned above, certain cars enable a change of the brake bias ratio between the two front wheels. This enables the car to turn more aggressively into a corner by essentially shutting off one of the brakes (i.e., the brake on the left front wheel or the brake on the right front wheel). As indicated above, the present disclosure can be used to provide that type of adjustment by connecting it to the threaded adapter within the car. In such case, the knob and the labeling system would provide the driver knowledge as to the adjustment between the front brakes. Thus, it should be appreciated that a car can have more than one brake bias adjustment assemblies of present disclosure. It should also be appreciated that the brake bias adjustment assembly of the present disclosure may be employed in other vehicles such as boats, airplanes, off-road vehicles, go-carts, all-terrain vehicles, earthmoving equipment and a wide other range of vehicles.

Turning back to the figures, the brake bias adjustment knob assembly 2080 of this specific illustrated example of present disclosure generally includes: (a) a knob 2100; (b) knob fasteners 2192 and 2194; (c) a cover plate or housing 2400; (d) a ring gear 2500; (e) a compound gear 2550; (f) a compound gear mount or axle 2580; (g) an idler gear 2600; (h) an idler gear mount or axle 2680; (i) a base plate 2700; (j) a new or existing mounting plate 2800; and (h) a plurality of dashboard fasteners (such as but not limited to the illustrated socket head cap bolts 2900 and 2910, washers 2912 and 2914, and nuts 2920 and 2930). When assembled, the brake bias adjustment knob assembly 2080 is configured to be attached to a dashboard 3000 of a vehicle (not shown) such as a race car (not shown) as further described below.

More specifically, the knob 2100 is configured to be rotated by the driver of the vehicle to rotate the connection cable 2090 to change the brake bias. This illustrated knob 2100 has a body 2110 having an upper portion 2114 and a lower portion 2112 connected to the upper portion 2114. The body 2210 has a generally cross shape or X shape which includes a plurality of outwardly extending protrusions or arms 2116a, 2116b, 2116c, and 2116d. These protrusions or arms 2116a, 2116b, 2116c, and 2116d are configured to enable the driver to grip the knob 2100 and easily make one or more quarter rotations, half rotations, three-quarter rotations, full rotations, or more than full rotations of the knob 2100 (without the need for the driver to look at the knob 2100). These protrusions or arms 2116a, 2116b, 2116c, and 2116d also define a plurality of indentations or pockets between the protrusions or arms 2116a, 2116b, 2116c, and 2116d which further facilitate gripping of the knob 2100 by the driver. The upper portion 2114 of the body 2110 also include a plurality of lips extending from the side walls of each of the protrusions or arms 2116a, 2116b, 2116c, and 2116d of the body 2110 to further facilitate gripping of the knob 2100 by the driver. It should be appreciated that the protrusions can be modified (such as by the manufacturer, installer, or driver) to have tactile differences which can be felt by the driver between the various processes of the knobs. For example, additional details on the outer perimeter lip of the knob can include serrations, bumps, and distinguishing scallops so that the driver has a more friendly or unusual or readily identifiable tactile feedback that the knob is in fact the unique knob in this assembly. It should also be appreciated that the illustrated knob is generally symmetrical, and that alternative embodiments can be non-symmetrical. It should also be appreciated that this configuration enables a driver to turn the knob multiple using fingers in a grasping motion to make delicate adjustments such as a one quarter turn.

Figure 14A:
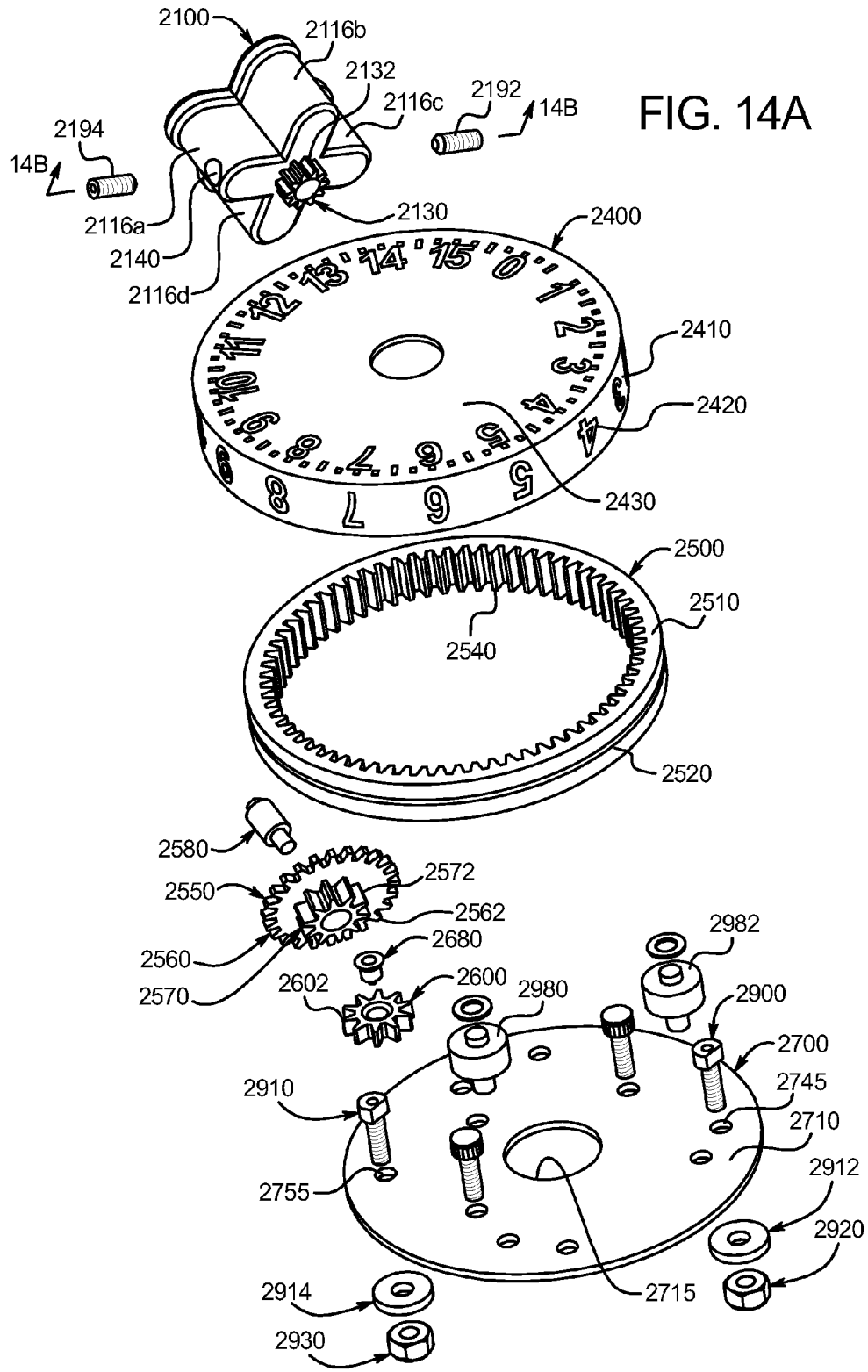
FIG. 14A is a further exploded perspective view of part of the example brake bias adjustment knob assembly of FIG. 12
Figure 14C:
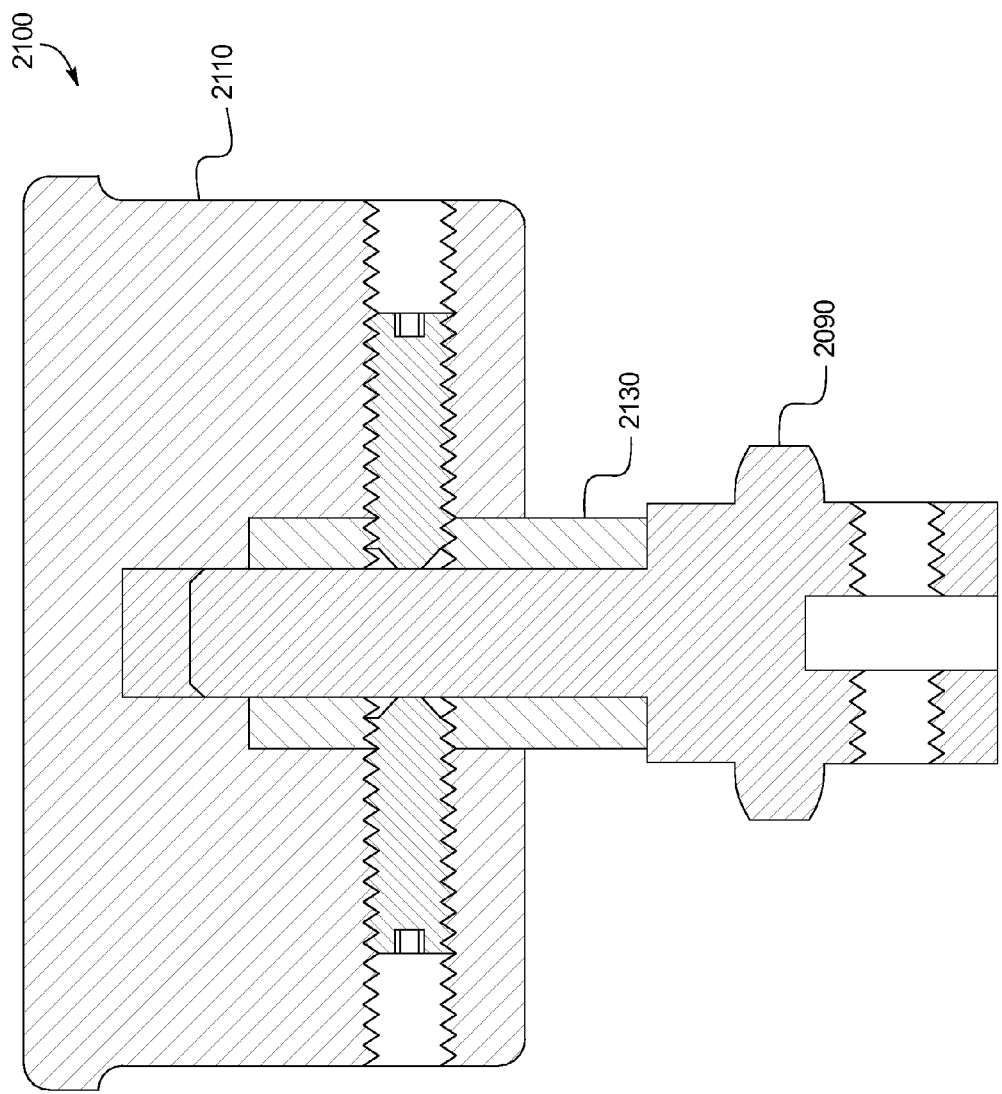
FIG. 14C is cross-sectional view of the example brake bias adjustment knob of FIG. 14A with the knob assembly attached to the end of the connection cable.
Figure 15:
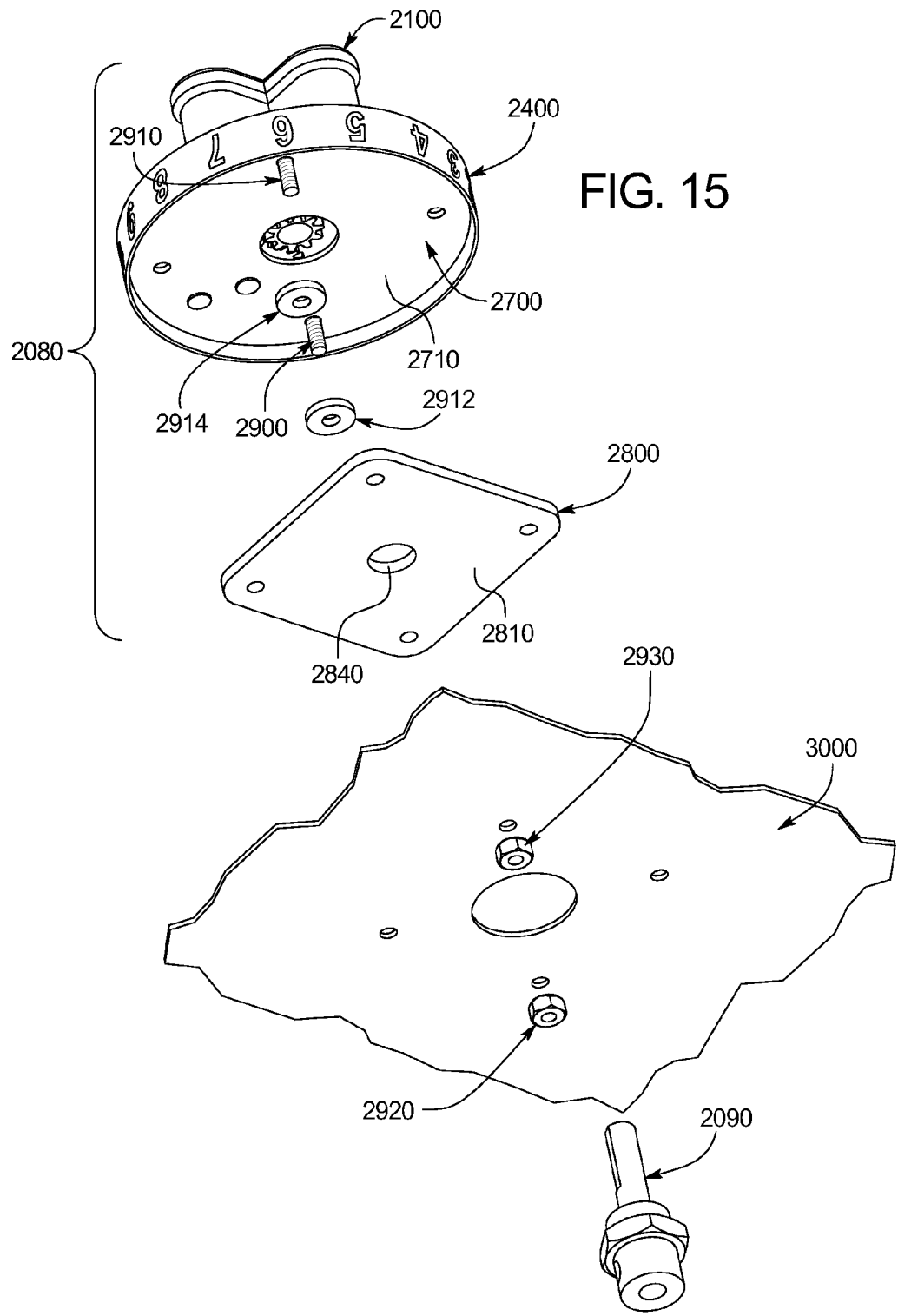
FIG. 15 is a partially exploded bottom perspective view of the example brake bias adjustment knob assembly of FIG. 12, and part of a dashboard (shown in fragmentary) and the end of the connection cable.
Figure 16:
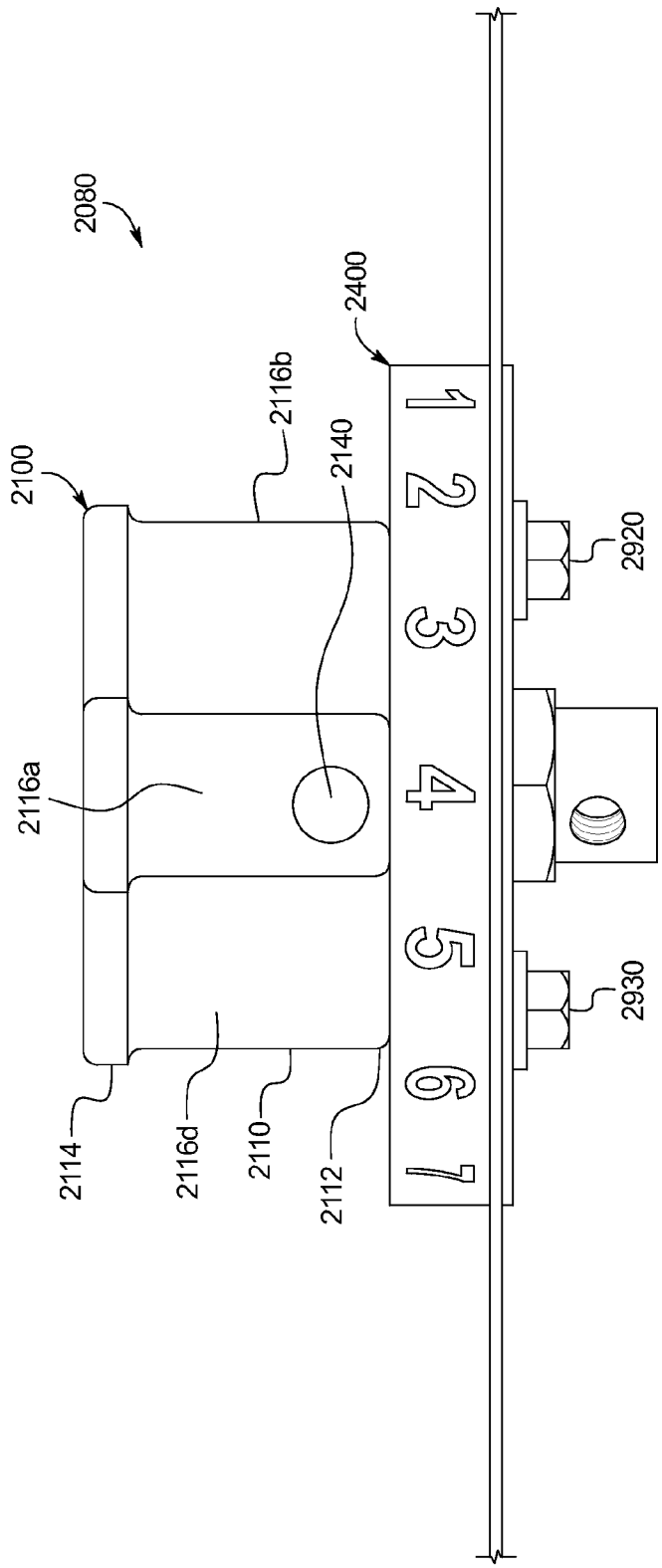
FIG. 16 is a side view of the example brake bias adjustment knob of FIG. 12 mounted on a dashboard (which is shown in fragmentary).
Figure 17:
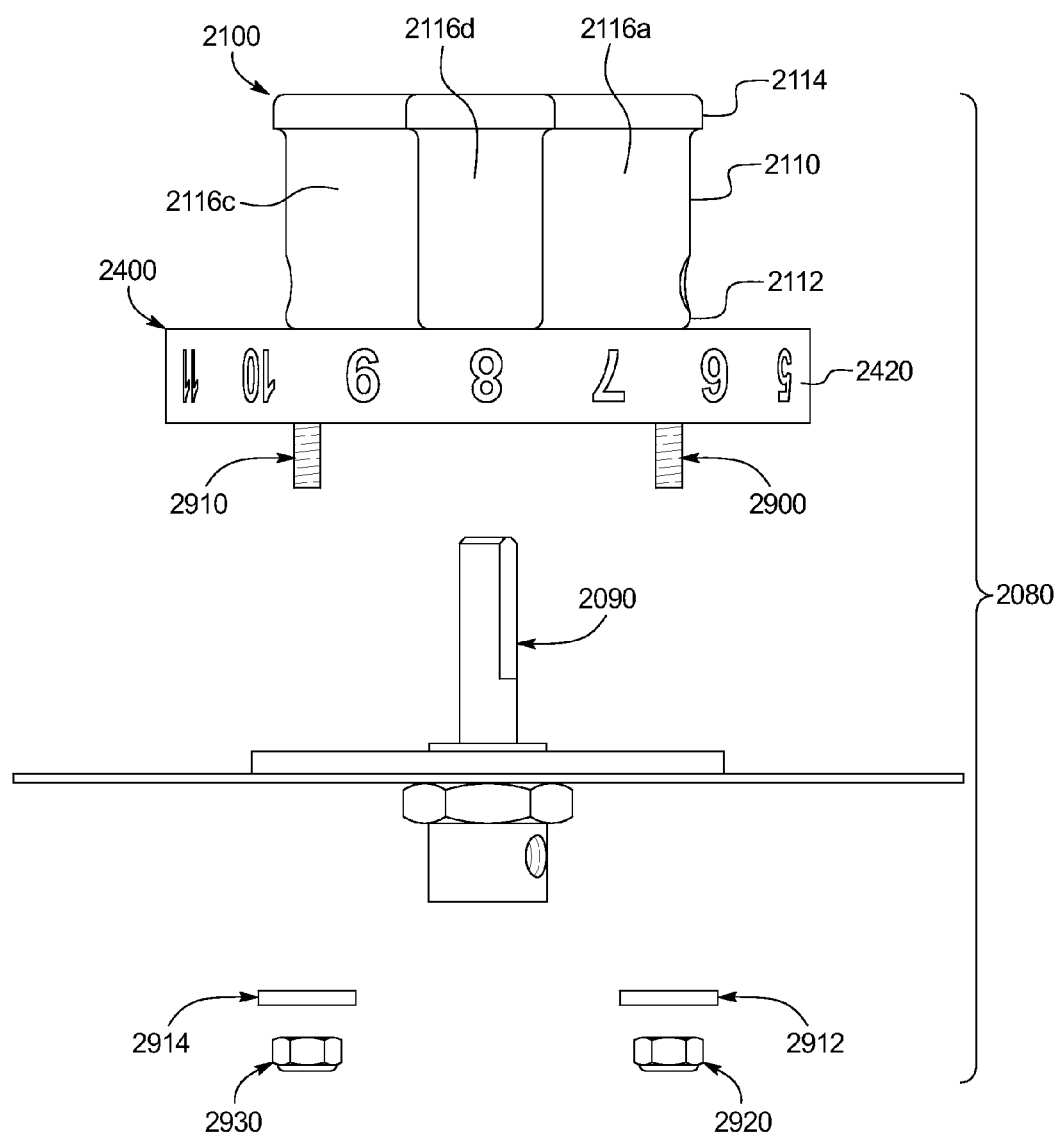
FIG. 17 is a side partially exploded view of the example brake bias adjustment knob assembly of FIG. 12, and a dashboard (which is shown in fragmentary) and the end of the connection cable.
Figure 18:
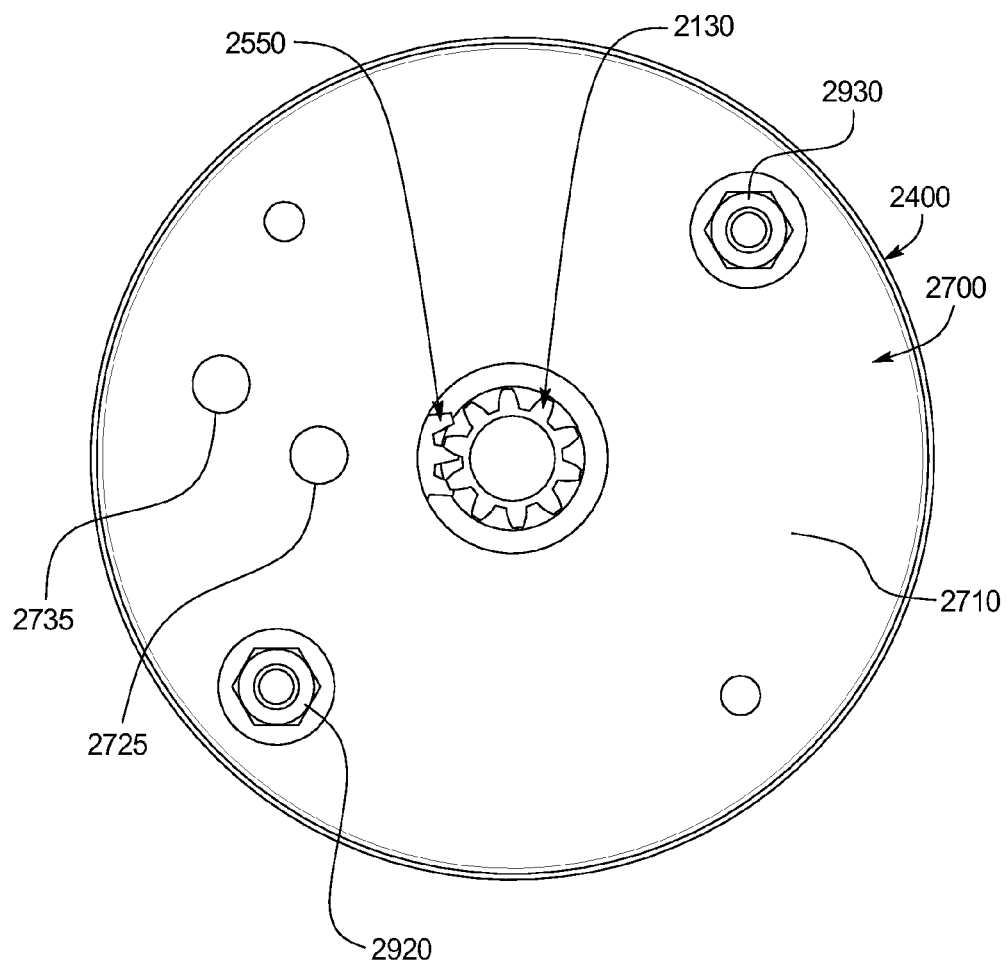
FIG. 18 is a bottom view the example brake bias adjustment knob assembly of FIG. 12.

The knob 2100 further includes an actuation gear 2130 extending from the lower portion 2112 of the body 2110 of the knob 2100. The actuation gear 2130 extends into and is fixed to the body 2110, and more specifically in this illustrated embodiment is integrally formed (e.g., molded) with the body 2110 (as generally shown in FIGS. 14B and 14C). The screws 2192 and 2194 are threaded so that they pass through the metal gear extension of 2134 to provide an ultra secure mounting with the script threads passing through the splined hollow gear number 2130 and into engagement with end of the connection cable (as best shown in FIG. 14C).

The actuation gear 2130 includes a plurality of outwardly extending teeth 2132 which are configured to engage and cause rotation of the compound gear 2550 which in turn causes rotation of the idler gear 2600 which in turn causes rotation of the ring gear 2500 which causes rotation of the cover plate or housing 2400. In this illustrated embodiment, the actuation gear 2130 is configured to co-act with the compound gear 2550, the idler gear 2600, and the ring gear 2500 such that each quarter revolution of the knob 2100 will cause a $\frac{1}{64}$ revolution of the ring gear 2400 and thus a $\frac{1}{64}$ revolution of the cover plate 2400 connected to the ring gear 2500. In this illustrated embodiment, the actuation gear 2130 is configured to co-act with the compound gear 2550, the idler gear 2600, and the ring gear 2500 such that each full revolution of the knob 2100 turn will cause a $\frac{1}{16}$ revolution of the ring gear 2400 and thus a $\frac{1}{16}$ revolution of the cover plate 2400 connected to the ring gear 2500. Thus, for every full turn of the knob 2100, the travel of the shaft is one turn, which in turn moves the fulcrum $\frac{1}{20}$ of an inch (i.e., 0.050 inches) either toward the left or toward the right. One quarter turn of the knob 2100 will move the center bearing $\frac{1}{80}$ of an inch (i.e., 0.0125 inches) either toward the left or toward the right.

It should be appreciated that certain race cars (in the United States) have different thread ratios on the threaded rod. Most of them however are $\frac{3}{8}$-20 or $\frac{7}{16}$-20 U.S. standard threads. These can be an equivalent metric or can be Whitworth threads, but most are approximately 20 turns per inch. The suffix 20 designates 20 turns per total inch of travel of a nut turning on the threaded rod.

The knob 2100 has at least one set screw receiving channel, and in this illustrated embodiment, the knob 2100 has two set screw receiving channels (including illustrated channel 2140) that enable set screws 2192 and 2194 to be used to securely attach the knob 2100 to the end of the connection cable 2090 and for easy calibration of the knob 2100 relative to the connection cable 2090. This also enables the driver (or a mechanic) to initially set a neutral position, or a position number that corresponds to either full front brakes or full rear brakes, at a specific number location on the cover plate 2400.

The knob 2100 in this illustrated embodiment is made from a suitable molded plastic. However, it should be appreciated that the knob can be made from other suitable materials and in any suitable manner. It should also be appreciated that the knob can be of other suitable configurations and sizes, and that the knob can be coated with a high friction coating such as a silicone or rubber, and/or with a high abrasion coating. The knob 2100 in various embodiments also includes a silicone bead that can be applied to portions of the knob to provide much more high friction or grip (such as like a work glove with rubber grip dots on it). It should also be appreciated that the high friction coating could be similar to the coatings applied to a garage floor or other a slippery area. This enables a coating with high friction particles dispersed on the surface and within the coating to function similar to sandpaper. It should also be appreciated that serrations or bumps can be added to the knob or edge of the knob 2100 for traction wearing gloves.

The cylindrical cover plate 2400 is attached to the ring gear 2500 such the rotation of the knob 2100 which causes the rotation of the connection cable and rotation of the ring gear 2500 also causes rotation of the cover plate 2400. More specifically, in this illustrated embodiment, the cover plate 2400 includes a cylindrical cover plate body 2410 having a downwardly extending cylindrical side wall 2420 and an inwardly extending cylindrical top wall 2430. The cylindrical side wall 2420 is configured to fit over the ring gear 2500. In this illustrated embodiment, the side wall 2420 is adhesively fastened or bonded to the ring gear 2500. It should be appreciated that other suitable attachment mechanisms may be employed in accordance with the present disclosure. In one embodiment, the ring gear 2500 is made from a polymer and the other gears are made from aluminum or stainless steel. This configuration is generally more forgiving and vibration resistant.

The front face and outer diameter of the cover plate 2400 each include a set of a plurality of different brake bias indication symbols (such as the different numbers on the illustrated cover plate 2400) which indicate the relative front to rear brake bias. In this example embodiment, the brake bias is indicated by the numbers 0 through 15¾. Depending upon the car and the installation, (a) 0 can represent the most front brake bias and 15¾ represents the most rear brake bias; or (b) 0 can represent the most rear brake bias and 15¾ represents the most front brake bias. It should thus be appreciated that if the front and rear master cylinders are mounted in opposite manners, the symbol or number arrangement can vary. It should also be appreciated that the numbering system can be reversed. It should also be appreciated that the brake bias indication symbols can be any suitable symbols. In another embodiment, a fine tuning knob engraving system is incorporated so that the approximately 360 degrees of rotation can be noted in percentages (such as 1% to 100%) or in increments (such as 5% or 10% increments) which provide for finer adjustment so the driver can select and reselect a finer adjustment of the bias and between the digits. As mentioned above, it should also be appreciated that one or more separate indicators (such as one or more labels, stickers, or decals) can be employed on the dashboard to provide one or more indications of the respective symbol as the cover plate 2400 turns.

The cover plate 2400 can be made from a suitable molded plastic, or other suitable rigid compound including aluminum or any other metal. The cover plate 2400 can be molded, fabricated, machined, or extruded. It should thus be appreciated that the cover plate can be made from other suitable materials and in any suitable manner. It should also be appreciated that the cover plate can be of other suitable configurations. It should further be appreciated that the symbols or numbers (on the front face or wall as well as on the outer diameter or wall) can be fluorescent and that the system can include other methods or mechanisms for lighting the entire assembly or least the numbered window for night driving such as night racing. It should also be appreciated that alternative number and color systems may be employed in accordance with the present disclosure. For example, the numbering system could split at the number eight. In this example, 0 to 8 could be a red color and 8 to 15.999 could be a green color. In another example, 0 to 8 could have a white background and black numbers, and 8 to 15.999 could be reversed with white numbers and black background.

The cylindrical ring gear 2500 includes a cylindrical ring gear body 2510. The cylindrical ring gear body 2510 includes a plurality of inwardly extending gear teeth 2540. These teeth 2540 are configured to mate with the teeth of the idler gear 2600. In this illustrated embodiment, the ring gear 2500 is configured to rotate 1/16 of a rotation for every full rotation of the knob 2100. Accordingly, for every full rotation of the knob 2100, the ring gear 2500 will cause the cover plate 2400 to either increase or decrease by 1 number in this illustrated embodiment. The ring gear 2500 in this embodiment is formed with a cylindrical groove 2520 configured to receive an adhesive to securely attach the ring gear 2500 to the cover plate 2400.

The ring gear 2500 in this illustrated embodiment is made from a suitable molded plastic. However, it should be appreciated that the ring gear can be made from other suitable materials and in any suitable manner. It should also be appreciated that the ring gear can be of other suitable configurations and markings and sizes and coated with low friction, anti wear coatings.

The cylindrical compound gear 2550 includes cylindrical first gear 2560 and a cylindrical second gear 2570 co-axially aligned and connected to the first gear 2560. The first gear 2560 and the second gear 2570 define a central hole configured to receive the compound gear mount or axle 2580 (which is a rivet in this example embodiment) which rotatably connects the compound gear 2550 to the base plate 2700. The first gear 2560 includes a plurality of outwardly extending teeth 2562. The second gear 2570 includes a plurality of outward extending teeth 2572. The teeth 2562 are configured to be engaged by and mate with the teeth 2132 of the actuation gear 2130. The teeth 2572 are configured to engage and mate with the teeth 2602 of the idler gear 2600. The first gear 2560 has a greater circumference than the second gear 2570. The second gear 2570 thus provides a greater quantity of rotations to the idler gear 2600 for every rotation of the first gear 2560. In other words, the compound gear 2550 functions as a reduction gear.

The compound gear 2550 in this illustrated embodiment is made from a pair of laser cut gears that are pressed together to create the compound gear. These gears are laser micro welded on the top surface to securely hold the two gears in the assembly. However, it should be appreciated that the compound gear can be made from other suitable materials and in other suitable manners. It should also be appreciated that the compound gear can be of other suitable configurations and sizes and coated with low friction, anti wear coatings.

The cylindrical idler gear 2600 has a plurality of outwardly extending teeth 2602. The idler gear 2600 defines a central opening configured to receive the idler gear mount or axle 2680 which rotatably connects the idler gear 2600 to the base plate 2700. The teeth 2602 are configured to be engaged by and mate with the teeth 2572 of the second gear 2570 of the compound gear 2550. The teeth 2602 are configured to engage and mate with the teeth 2540 of the ring gear 2500 to cause rotation of the ring gear 2500.

In this illustrated embodiment, the idler gear 2600 is configured to pivot on a fastener 2680 that has a slightly coined or larger diameter top which corresponds with a chamfer style on the top of idler gear 2600. The top of the idler gear 2600 is slightly chamfered to correspond to the larger diameter upper edge of pivot 2680. This configuration prevents vibration from dislodging or enabling the idler gear 2600 to rise or fall on the pivot or fastener 2680 more than a relatively small amount. The idler gear 2600 is thus configured to float slightly vertically. The idler gear pivot or fastener 2680 is pressed into the base plate assembly through the base plate 2700. In other words, the pivot or fastener 2680 is pressed into the base plate 2700 and then welded on the backside of the base plate. In various embodiments, the pivot and the inside or bore of the 2600 idler gear are coated for long term lubrication and thus long life. It should thus be appreciated that the idler gear 2600 takes most of the torque through the assembly.

The idler gear 2600 in this illustrated embodiment is made from a laser cut steel and is subsequently chamfered in a secondary operation at the top of the bore that is laser cut initially. This is followed by a honing operation to provide the precise engineering clearance between the pivot 2680 and the inside of the idler gear 2600. However, it should be appreciated that the idler gear can be made from other suitable materials and in any suitable manner. It should also be appreciated that the idler gear can be of other suitable configurations and sizes and coated with low friction, anti wear coatings.

From the above, in this illustrated embodiment, it should be appreciated that rotation of the knob 2100 and thus rotation of the actuation gear 2130 causes rotation of the connection cable and also rotation of the first gear 2560 of the compound gear 2550 which causes rotation of the second gear 2570 of the compound gear 2550 which in turn causes rotation of the idler gear 2600 which in turn causes rotation of the ring gear 2500 and thus rotation of the cover plate 2400 which is secured to the ring gear 2500.

It should further be appreciated that this arrangement or configuration of the gears prevents or inhibits rotation of the connector cable 2090 that causes rotation of the knob 2100. In other words, this configuration makes driving the gears backward (through the reduction of the gear train) extremely difficult. More specifically, the friction within the gear train acts as a snubbing mechanism or limiter so vibration will not dislodge the mechanism or cause undesired movement of the mechanism. In addition, the slight compressibility of elastomeric gear 2500 helps retain the setting the driver has chosen even with severe vibration affecting the entire vehicle. In certain embodiments, two bearings 2980 and 2982 are appropriately positioned to maintain concentricity of ring gear 2500 even in extreme vibration conditions. For example, in really violent or rough conditions such as off-road racing or rallying, these bearings 2980 and 2982 stabilize the outer ring and/or keep everything concentrically arranged. There is little to no play in the system because of the accuracy of the laser cut gears and also because the plastic/rubber molded gear 2500 which is compressible to a certain extent and thus functions as a resilient cushioning device.

The base plate 2700 includes a generally flat cylindrical base plate body 2710 which defines a central opening 2715, a compound gear mount or axle opening 2725, an idler gear mount or axle opening 2735, and fastener openings 2745 and 2755. The base plate 2700 can include more or less openings to account for the various different ways to mount the base plate 2700 (on a new car or on a existing car) contemplated by the present disclosure.

The base plate 2700 in this illustrated embodiment is made from a suitable metal such as mild steel or stainless steel. However, it should be appreciated that the base plate can be made from other suitable materials and in any suitable manner. It should also be appreciated that the base plate can be of other suitable configurations and sizes. It should be appreciated that the base plate can be coated with a low friction, anti-wear, and corrosion resistant coating.

As described above, the fasteners may be welded or otherwise suitably attached to the base plate 2700. In this illustrated embodiment, two fasteners (including bolts 2900 and 2910, washers 2912 and 2914, and nuts 2920 and 2930) are employed to attach the base plate 2700 to the mounting plate 2800 and to the dashboard 3000 and thus to attach the entire brake bias adjustment knob assembly 2080 to the dashboard 3000. The base plate 2700 is configured to co-act with the mounting plate 2800 for attaching these parts to the dashboard 3000, or to alternatively work with the mounting plates of existing brake bias adjustment knob assemblies for retrofitting vehicles as further described below. It should be appreciated that the base plate and the attachment fasteners may vary for new and existing cars in accordance with the present disclosure.

The illustrated mounting plate 2800 (which may be an existing plate or a new plate) includes a generally square plate body 2810 which defines a central cable hole 2840, and four dashboard attachment holes. The central cable hole 2840 enables the connection cable 2090 to extend through the mounting plate 2800 to the knob 2100. It should be appreciated that in various embodiments, the base plate 2700 is mounted to the existing mounting plate 2800.

The mounting plate 2800 in this illustrated embodiment is made from a suitable metal such as mild steel or stainless steel. However, it should be appreciated that the mounting plate can be made from other suitable materials and in any suitable manner. It should also be appreciated that the mounting plate can be of other suitable configurations and sizes. It should be appreciated that the mounting plate can be coated with a low friction, anti-wear, and corrosion resistant coating.

Installation on Completely New Vehicle

In one embodiment, to install a brake bias adjustment knob assembly 2080 of the present disclosure on a completely new vehicle (such as a completely new race car) which does not have any existing brake bias adjustment knob, the installer attaches the mounting plate 2800 to dashboard using fasteners such as two rivets (not shown) extending through two of the dashboard attachment holes in opposing corners in the mounting plate 2800. The installer then attaches the base plate 2700 (with the assembled cover plate 2400, ring gear 2500, compound gear 2550, compound gear mount or axle 2580, idler gear 2600, idler gear mount or axle 2680) to the mounting plate 2800 by inserting fasteners such as the two bolts 2900 and 2910 through the other two dashboard attachment holes in opposing corners of the mounting plate 2800 as somewhat illustrated in FIG. 15. The installer secures the fasteners such as by attaching the washers 2912 and 2914 and vibration resistant nuts 2920 and 2930 to the bolts 2900 and 2910 to hold or secure the base plate 2700 onto the mounting plate 2800 and the dashboard 3000. The installer also uses the knob fasteners 2192 and 2194 to secure the knob 2100 to the end of the connection cable 2090 and thus the brake bias adjustment knob assembly 2080 to the connection cable 2090. It should be appreciated that the mounting plate may be attached to the dashboard in other suitable manners. It should further be appreciated that the base plate may be attached to the mounting plate and the dashboard in other suitable manners. It should further be appreciated that in one embodiment, to calibrate the setting to either a full front brake bias or a full rear brake bias, the installer can install the brake bias adjustment knob assembly so that it is either at 0 or 15¾.

Installation on Existing Vehicle

In another embodiment, to install a new brake bias adjustment knob assembly of the present disclosure on an existing vehicle (such as a race car) that already has a commercially available brake bias adjustment knob, the installer turns the existing knob all the way in one direction (i.e., either to full front brake bias or full rear brake bias) and removes the existing knob by taking out the set screw(s) in the existing knob and notes the position of the protruding cable end and particularly the flat portion of the protruding cable end. The installer does not remove the existing mounting plate 2800. Rather, the installer drills out two of the rivets that hold that existing mounting plate to the dashboard 3000 of the vehicle (not shown). The installer then attaches the base plate 2700 (with the assembled cover plate 2400, ring gear 2500, compound gear 2550, compound gear mount or axle 2580, idler gear 2600, idler gear mount or axle 2680) to the mounting plate 2800 by inserting fasteners such as the two bolts 2900 and 2910 through the two drilled out dashboard attachment holes in opposing corners of the mounting plate 2800 as somewhat illustrated in FIG. 15. The installer secures the fasteners such as by attaching the two washers and vibration resistant nuts 2920 and 2930 to the bolts 2900 and 2910 to hold the base plate 2700 onto the existing mounting plate and the dashboard 3000. The installer also uses the knob fasteners 2192 and 2194 to secure the knob 2100 to the connection cable 2090 and thus the brake bias adjustment knob assembly 2080 to the connection cable 2090. It should further be appreciated that the base plate may be attached to the mounting plate and the dashboard in other suitable manners. It should further be appreciated that in one embodiment, to calibrate the setting to either a full front brake bias or a full rear brake bias, the installer can install the brake bias adjustment knob assembly so that it is either at 0 or 15¾.

It should be appreciated, as stated above, that suitable labels, decals, or adhesive stickers in the form of a curved arrow can be provided to enable the driver quick reference as to which way to turn the knob to add or subtract relative braking force that the driver desires. These labels, decals, or stickers can indicate either clockwise or counterclockwise rotation for front braking and also for rear braking as shown in FIGS. 12A and 12B. It should also be appreciated that certain cars have master cylinders mounted front to the right of the brake pedal and some are reversed and that multiple different decals or stickers (such as both directional decals and sticker arrows) can be provided to account for this.

It should also be appreciated that this second illustrated embodiment can include one or more components (such as a spring or spring loaded or biased component) that provide(s) the driver a tactile feel and/or at least some audible determinant for motion of the knob 2100 such as for each quarter rotation of the knob 2100.

It should be appreciated from the above that the present disclosure thus provides a vehicle braking system brake bias adjustment knob assembly for a vehicle braking system brake bias adjuster for a pedal assembly of a vehicle braking system of a vehicle, where the vehicle braking system brake bias adjustment knob assembly includes: (1) a knob having an upper portion, a lower portion connected to the upper portion, and an actuation gear extending from the lower portion, the knob configured to be connected to a connection cable of the vehicle braking system brake bias adjuster to enable a driver of the vehicle to set one of a plurality of different amounts of front brake bias, one of a plurality of different amounts of rear brake bias, or neutral which means no amount of front brake bias and no amount of rear brake bias; (2) a compound gear including a first gear and a second gear; (3) an idler gear; (4) a ring gear; and (5) a cover plate having a wall displaying a plurality of different brake bias indication symbols configured to correspond to the plurality of different amounts of front brake bias, the plurality of different amount of rear brake bias, and the no amount of front brake bias and no amount of rear brake bias, and wherein the knob, the actuation gear, the compound gear, the idler gear, the ring gear, and the cover are The invention is claimed as follows:

1. A vehicle braking system brake bias adjustment knob assembly for a vehicle braking system brake bias adjuster for a pedal assembly of a vehicle braking system of a vehicle, said vehicle braking system brake bias adjustment knob assembly comprising:
   a knob having an upper portion, a lower portion connected to the upper portion, and an actuation gear extending from the lower portion, the knob configured to be connected to a connection cable of the vehicle braking system brake bias adjuster to enable a driver of the vehicle to set and readily visually identify each one of a plurality of different amounts of a first brake bias, each one of a plurality of different amounts of a second brake bias, and no amount of first brake bias and no amount of second brake bias;
   a compound gear including a first gear and a second gear;
   an idler gear;
   a ring gear; and
   a cover plate having at least one wall displaying a plurality of different brake bias indication symbols readily identifiable by a driver and configured to correspond to the plurality of different amounts of first brake bias, the plurality of different amounts of second brake bias, and the no amount of first brake bias and no amount of second brake bias, and
   wherein the knob, the actuation gear, the compound gear, the idler gear, the ring gear, and the cover are configured:
      (a) to be assembled such that rotation of the knob causes rotation of the compound gear which in turn causes rotation of the idler gear which in turn causes rotation of the ring gear which causes rotation of the cover,
      (b) to be attached to the connection cable to enable reproducible setting of brake bias between two brake cylinders of the vehicle braking system, and
      (c) indicate the setting of the brake bias between the two brake cylinders of the vehicle braking system.

2. The vehicle braking system brake bias adjustment knob assembly of claim 1, which includes a base plate.

3. The vehicle braking system brake bias adjustment knob assembly of claim 1, wherein the knob has a plurality of protrusions.

4. The vehicle braking system brake bias adjustment knob assembly of claim 1, wherein the knob has a plurality of protrusions with a plurality of serrations.

5. The vehicle braking system brake bias adjustment knob assembly of claim 1, wherein the knob defines at least one set screw receiving channel.

6. The vehicle braking system brake bias adjustment knob assembly of claim 1, wherein the knob has a plurality of outwardly extending lips.

7. The vehicle braking system brake bias adjustment knob assembly of claim 1, wherein the different brake bias indication symbols are sequential numbers.

8. The vehicle braking system brake bias adjustment knob assembly of claim 1, wherein the different brake bias indication symbols are sequential numbers and which includes divisions between the numbers noted with markings.

9. The vehicle braking system brake bias adjustment knob assembly of claim 1, wherein the cover plate bonded to the ring gear.

10. The vehicle braking system brake bias adjustment knob assembly of claim 1, wherein the cover plate is snap fit onto the ring gear.

11. The vehicle braking system brake bias adjustment knob assembly of claim 1, wherein the first gear of the compound gear has a greater circumference than the second gear of the compound gear.

12. The vehicle braking system brake bias adjustment knob assembly of claim 1, wherein the ring gear and the cover plate are each cylindrical.

13. The vehicle braking system brake bias adjustment knob assembly of claim 1, which includes a mounting plate.

14. A vehicle braking system brake bias adjuster comprising:
   (a) a biasing mechanism attachable to a pedal assembly of a vehicle;
   (b) a connection cable attachable at one end to the biasing mechanism; and
   (c) a brake bias adjustment knob assembly attachable to a dashboard of the vehicle, said brake bias adjustment knob assembly including:
      a knob having an upper portion, a lower portion connected to the upper portion, and an actuation gear extending from the lower portion, the knob configured to be connected to the connection cable to enable a driver of the vehicle to set and readily visually identify each one of a plurality of different amounts of a first brake bias, each one of a plurality of different amounts of a second brake bias, and no amount of first brake bias and no amount of second brake bias;
      a compound gear including a first gear and a second gear;
      an idler gear;
      a ring gear; and
      a cover plate having a wall displaying a plurality of different brake bias indication symbols configured to correspond to the plurality of different amounts of first brake bias, the plurality of different amounts of second brake bias, and the no amount of first brake bias and no amount of second brake bias, and
      wherein the knob, the actuation gear, the compound gear, the idler gear, the ring gear, and the cover are configured:
         (a) to be assembled such that rotation of the knob causes rotation of the compound gear which in turn causes rotation of the idler gear which in turn causes rotation of the ring gear which causes rotation of the cover,
         (b) to be attached to the connection cable to enable reproducible setting of brake bias between two brake cylinders of the vehicle braking system, and
         (c) indicate the setting of the brake bias between the two brake cylinders of the vehicle braking system.

15. The vehicle braking system brake bias adjuster of claim 14, which includes a base plate.

16. The vehicle braking system brake bias adjuster of claim 14, wherein the knob has a plurality of protrusions.

17. The vehicle braking system brake bias adjuster of claim 14, wherein the knob has a plurality of protrusions with a plurality of serrations.

18. The vehicle braking system brake bias adjuster of claim 14, wherein the knob defines at least one set screw receiving channel.

19. The vehicle braking system brake bias adjuster of claim 14, wherein the knob has a plurality of outwardly extending lips.

20. The vehicle braking system brake bias adjuster of claim 14, wherein the knob has a plurality of outwardly extending lips with serrations.

21. The vehicle braking system brake bias adjuster of claim 14, wherein the knob has a plurality of outwardly extending lips with a high grip edge.

22. The vehicle braking system brake bias adjuster of claim 14, wherein the different brake bias indication symbols are sequential numbers.

23. The vehicle braking system brake bias adjuster of claim 14, wherein the different brake bias indication symbols are sequential numbers and which includes divisions between the numbers noted with markings.

24. The vehicle braking system brake bias adjuster of claim 14, wherein the cover plate is bonded to the ring gear.

25. The vehicle braking system brake bias adjuster of claim 14, wherein the cover plate is snap fit onto the ring gear.

26. The vehicle braking system brake bias adjuster of claim 14, wherein the first gear of the compound gear has a greater circumference than the second gear of the compound gear.

27. The vehicle braking system brake bias adjuster of claim 14, wherein the ring gear and the cover are each cylindrical.

28. The vehicle braking system brake bias adjuster of claim 14, which includes a mounting plate.

* * * * *

UNITED STATES PATENT AND TRADEMARK OFFICE
CERTIFICATE OF CORRECTION

| | | |
|---|---|---|
| PATENT NO. | : 9,266,509 B1 | Page 1 of 1 |
| APPLICATION NO. | : 14/552947 | |
| DATED | : February 23, 2016 | |
| INVENTOR(S) | : Bruce Nesbitt | |

It is certified that error appears in the above-identified patent and that said Letters Patent is hereby corrected as shown below:

IN THE CLAIMS

In Claim 1, Column 21, Line 37, between "cover" and "are" insert --plate--.
In Claim 1, Column 21, Line 41, between "cover" and "," insert --plate--.
In Claim 9, Column 22, Line 2, between "plate" and "bonded" insert --is--.
In Claim 14, Column 22, Line 46, between "cover" and "are" insert --plate--.
In Claim 14, Column 22, Line 52, between "cover" and "," insert --plate--.
In Claim 27, Column 23, Line 25, between "cover" and "are" insert --plate--.

Signed and Sealed this
Twenty-fourth Day of May, 2016

Michelle K. Lee
*Director of the United States Patent and Trademark Office*